US012750776B2

(12) United States Patent
Chen

(10) Patent No.: US 12,750,776 B2
(45) Date of Patent: Sep. 29, 2026

(54) METHOD FOR SMALL DATA TRANSMISSION IN POWER SAVING STATE AND RELATED DEVICES

(71) Applicant: PURPLEVINE INNOVATION COMPANY LIMITED, Hong Kong (HK)

(72) Inventor: Chiu-Wen Chen, Hong Kong (HK)

(73) Assignee: PURPLEVINE INNOVATION COMPANY LIMITED, Hong Kong (CN)

( * ) Notice: Subject to any disclaimer, the term of this patent is extended or adjusted under 35 U.S.C. 154(b) by 302 days.

(21) Appl. No.: 18/571,246

(22) PCT Filed: Jun. 23, 2022

(86) PCT No.: PCT/CN2022/100872
§ 371 (c)(1),
(2) Date: Dec. 17, 2023

(87) PCT Pub. No.: WO2022/268173
PCT Pub. Date: Dec. 29, 2022

(65) Prior Publication Data

US 2024/0292328 A1 Aug. 29, 2024

Related U.S. Application Data

(60) Provisional application No. 63/213,831, filed on Jun. 23, 2021.

(51) Int. Cl.
*H04W 52/02* (2009.01)
*H04L 5/14* (2006.01)
(Continued)

(52) U.S. Cl.
CPC ........... *H04W 52/0225* (2013.01); *H04L 5/14* (2013.01); *H04W 56/0045* (2013.01);
(Continued)

(58) Field of Classification Search
CPC ......... H04W 52/0225; H04W 56/0045; H04W 68/02; H04W 72/04; H04W 72/0457;
(Continued)

(56) References Cited

U.S. PATENT DOCUMENTS 12,133,201 B2 * 10/2024 Agiwal ................. H04W 76/27
12,369,164 B2 * 7/2025 Tsai ...................... H04W 72/23
(Continued)

FOREIGN PATENT DOCUMENTS

CN 102573018 A 7/2012
CN 109496453 A 3/2019
(Continued)

OTHER PUBLICATIONS

International Search Report in International application No. PCT/CN2022/100872, mailed on Sep. 28, 2022.
(Continued)

*Primary Examiner* — Julio R Perez
(74) *Attorney, Agent, or Firm* — PV IP PC; Wei Te Chung

(57) ABSTRACT

A method for small data transmission (SDT) in a power saving state is provided. The method includes applying at least one SDT related timer during the SDT on a first SDT bandwidth part (BWP) for the UE in the power saving state; and if the at least one SDT related timer is not running on the first SDT BWP, switching from the first SDT BWP to a second SDT BWP for receiving at least one of updated system information (SI) or public warning system (PWS) information from the network. With this method, monitoring SI change and/or PWS information on associated BWP during the SDT can achieved.

20 Claims, 8 Drawing Sheets

(51) Int. Cl.

| | |
|---|---|
| ***H04W 56/00*** | (2009.01) |
| ***H04W 68/02*** | (2009.01) |
| ***H04W 72/04*** | (2023.01) |
| ***H04W 72/0457*** | (2023.01) |
| ***H04W 72/231*** | (2023.01) |
| ***H04W 76/20*** | (2018.01) |
| ***H04W 76/50*** | (2018.01) |

(52) U.S. Cl.
CPC ........... *H04W 68/02* (2013.01); *H04W 72/04* (2013.01); *H04W 72/0457* (2023.01); *H04W 72/231* (2023.01); *H04W 76/20* (2018.02); *H04W 76/50* (2018.02)

(58) Field of Classification Search
CPC ... H04W 72/231; H04W 76/20; H04W 76/50; H04W 4/06; H04W 48/16; H04W 4/90; H04W 76/27; H04L 5/14; Y02D 30/70
See application file for complete search history.

(56) References Cited

U.S. PATENT DOCUMENTS

| | | | | |
|---|---|---|---|---|
| 12,376,183 | B2 * | 7/2025 | Xu | H04W 74/006 |
| 2020/0351786 | A1 | 11/2020 | Koskela et al. | |
| 2023/0080733 | A1 * | 3/2023 | Tao | H04W 76/27<br>370/328 |
| 2023/0209504 | A1 * | 6/2023 | Agiwal | H04W 76/27<br>455/458 |
| 2024/0098797 | A1 * | 3/2024 | Liu | H04W 74/006 |
| 2024/0292328 | A1 * | 8/2024 | Chen | H04W 4/06 |
| 2025/0254659 | A1 * | 8/2025 | Dai | H04W 74/006 |

FOREIGN PATENT DOCUMENTS

| | | | | | |
|---|---|---|---|---|---|
| CN | 110574440 | A | | 12/2019 | |
| CN | 2021002632 | A1 | | 1/2021 | |
| CN | 112913315 | A1 | | 6/2021 | |
| CN | 116889043 | A | * | 10/2023 | H04W 68/02 |
| CN | 118354361 | A | * | 7/2024 | H04W 52/0225 |
| DK | 2258124 | T3 | * | 8/2018 | H04W 4/90 |
| WO | WO-2009117366 | A1 | * | 9/2009 | H04W 4/90 |
| WO | WO-2021031112 | A1 | * | 2/2021 | H04W 74/0833 |
| WO | 2021083881 | A1 | | 5/2021 | |

OTHER PUBLICATIONS

Written Opinion of the International Search Authority in International application No. PCT/CN2022/100872,mailed on Sep. 28, 2022.

Huawei et al. “Running MAC CR for Small Data” 3GPP TSG-RAN2 Meeting #114e R2-2105031, May 25, 2021 (May 25, 2021), section 5.15.1.

International Search Report in International application No. PCT/CN2022/100879, mailed on Aug. 31, 2022.

Written Opinion of the International Search Authority in International application No. PCT/CN2022/100879, mailed on Aug. 31, 2022.

VIVO Report of [Post113bis-e][507][SDT] Resource configuration aspects 3GPP TSG-RAN WG2 Meeting #114-electronic R2-2104762 May 27, 2021 (May 27, 2021) section 4.1 BWP operation.

LG Electronics Inc. Discussion on CG-SDT open issues 3GPP TSG-RAN2#114-e R2-2105598 May 27, 2021 (May 27, 2021) section 2. Discussion.

* cited by examiner

METHOD FOR SMALL DATA TRANSMISSION IN POWER SAVING STATE AND RELATED DEVICES

TECHNICAL FIELD

The present disclosure relates to the field of wireless communications, and more particularly, to a method for small data transmission (SDT) in a power saving state and related devices.

BACKGROUND ART

Communication systems and networks have developed towards being a broadband and mobile system. In cellular wireless communication systems developed by the Third Generation Partnership Project (3GPP), user equipment (UE) is connected by a wireless link to a radio access network (RAN). The RAN includes a set of base stations (BSs) which provide wireless links to the UEs located in cells covered by the base station, and an interface to a core network (CN) which provides overall network control. As will be appreciated the RAN and CN each conduct respective functions in relation to the overall network. The 3GPP has developed the so-called Long Term Evolution (LTE) system, namely, an Evolved Universal Mobile Telecommunication System Territorial Radio Access Network (E-UTRAN), for a mobile access network where one or more macro-cells are supported by a base station known as an eNodeB or eNB (evolved NodeB). More recently, evolved from LTE, the so-called 5G or New radio (NR) systems where one or more cells are supported by a base station known as a gNB.

In LTE, the network may order the UE to get into an RRC_IDLE state if the UE has no activity for a while. This is done to reduce UE's power consumption. The UE needs to transit from the RRC_IDLE state to an RRC_CONNECTED state whenever the UE needs to perform some activity. Since small amounts of data have to be sent very frequently in current mobile communication applications, frequent Idle-Connected-Idle transitions increase network signaling load and latency. Therefore, 5G NR has defined a new state called RRC_INACTIVE to reduce network signaling load and latency involved in transiting to RRC_CONNECTED state. In NR, a UE is in RRC_CONNECTED when an RRC connection has been established or in RRC_INACTIVE when the RRC connection is suspended. If this is not the case, the UE is in RRC_IDLE state, that is, no RRC connection is established. The RRC_INACTIVE and RRC_IDLE states may be referred to a power saving state. More specifically, in RRC_INACTIVE state, the UE Access Stratum (AS) context is stored at both UE and network sides so that the core network connection is maintained (i.e., the UE keeps in CM (abbreviated from Connection Management)-CONNECTED) and the radio access network (RAN) connection is released. The network can reach the inactive UE through RAN or CN Paging messages.

UE performs a random access (RA) procedure to get access to network. The RA procedure can be classified into a Contention Free Random Access (CFRA) type and a Contention-based Random Access (CBRA) type. The contention-free or contention-based RA procedure can be a four-step (4-step) procedure or a two-step (2-step) procedure. Taking 4-step contention-based Random Access RA procedure for example, the UE transmits a contention-based PRACH preamble, also known as MSG1. After detecting the preamble, the gNB responds with a random-access response (RAR), also known as MSG2. The RAR includes an uplink grant for scheduling a PUSCH transmission from the UE known as MSG3. In response to the RAR, the UE transmits MSG3 including an ID for contention resolution. Upon receiving MSG3, the network transmits a contention resolution message, also known as MSG4, with the contention resolution ID. The UE receives MSG4, and if the UE finds its contention-resolution ID it sends an acknowledgement on a PUCCH, which completes the 4-step random access procedure. The 2-step RA procedure is to reduce latency and control signaling overhead by having a single round trip cycle between the UE and the base station. This is achieved by combining the preamble (MSG1) and the scheduled PUSCH transmission (MSG3) into a single message (MSGA) from the UE to the gNB, known as MSGA and by combining the random-access respond (MSG2) and the contention resolution message (MSG4) into a single message (MSGB) from the gNB to UE. The 2-step procedure and the 4-step procedure can be applied to the CFRA in the case that the dedicated preamble is provided to the UE.

Small data transmission (SDT) by random access channel (RACH) or configured grant (CG) in power saving state is supported for NR system. Moreover, small data transmission on bandwidth parts is an essential issue in order to reduce the UE's power consumption. With bandwidth parts (BWPs), the carrier can be subdivided and used for spectrum and power efficiency. The UEs in power saving state are only required to monitor the pagingSearchSpace on the initial BWP for updated system information reception. If the configured grant based small data transmission (CG-SDT) resources can be configured on either initial BWP or separate SDT BWP, the UE can be configured to transmit small data on the separate SDT BWP other than the initial BWP. The problem is how to guarantee the UE on the separate SDT BWP can monitor the pagingSearchSpace after initiating SDT for system information change, emergency service, public warning system. Therefore, when the small data is able to transmit on any one of the configured bandwidth parts other than the initial BWP, there is a need of design the operations for system information change indication. Meanwhile, the public warning system indication can be also considered.

SUMMARY

An object of the present disclosure is to propose a method for small data transmission (SDT) in a power saving state and related devices, which can solve issues in the prior art, monitor system information change and/or public warning system information on associated bandwidth part (BWP) during the SDT, improve resource efficiency, improve power consumption and signaling overhead, and/or provide a good communication performance.

In a first aspect of the present disclosure, provided is a method for small data transmission (SDT) in a power saving state, performed by a user equipment (UE) in a network, the method including: applying at least one SDT related timer during the SDT on a first SDT bandwidth part (BWP) for the UE in the power saving state; and if the at least one SDT related timer is not running on the first SDT BWP, switching from the first SDT BWP to a second SDT BWP for receiving at least one of updated system information (SI) or public warning system (PWS) information from the network.

In a second aspect of the present disclosure, provided is a method for small data transmission (SDT) in a power saving state, performed by a base station (BS) in a network, the method including: configuring a user equipment (UE)

with at least one SDT related timer for the UE to apply during the SDT on a first SDT bandwidth part (BWP) in the power saving state; and if the at least one SDT related timer is not running on the first SDT BWP, expecting the UE to switch from the first SDT BWP to a second SDT BWP for receiving at least one of updated system information (SI) or public warning system (PWS) information from the BS.

In a third aspect of the present disclosure, a user equipment includes a memory, a transceiver and a processor coupled to the memory and the transceiver, the processor cooperates with the transceiver to call and run program instructions stored in a memory, to execute the above method.

In a fourth aspect of the present disclosure, a base station includes a memory, a transceiver and a processor coupled to the memory and the transceiver, the processor cooperates with the transceiver to call and run program instructions stored in a memory, to execute the above method.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a tenth aspect of the present disclosure, a computer program causes a computer to execute the above method.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1(*b*) is a block diagram of a user equipment and a base station of wireless communication in a communication controlling system according to an embodiment of the present disclosure.

FIG. 4(*b*) is a schematic diagram illustrating a second type of BWP deployment for TDD system.

FIG. 4(*c*) is a schematic diagram illustrating a third type of BWP deployment for FDD system.

FIG. 4(*d*) is a schematic diagram illustrating a fourth type of BWP deployment for TDD system.

FIG. 4(*e*) is a schematic diagram illustrating a fifth type of BWP deployment for FDD system.

FIG. 4(*f*) is a schematic diagram illustrating a sixth type of BWP deployment for TDD system.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In this document, the term "/" should be interpreted to indicate "and/or." A combination such as "at least one of A, B, or C," "one or more of A, B, or C," "at least one of A, B, and C," "one or more of A, B, and C," or "A, B, and/or C" may be A only, B only, C only, A and B, A and 30 C, B and C, or A and B and C, where any combination may contain one or more members of A, B, or C.

The invention is to monitor system information change and/or public warning system information on associated bandwidth part (BWP) during small data transmission (SDT) for a user equipment (UE) in a power saving state. The methods and devices of the invention are described herein that support with small data transmission (SDT) in a new radio access system (e.g., NR). The infrequent (e.g., periodic and/or non-periodic) small data can be transmitted when the UE is in power saving state (e.g., RRC_INACTIVE or RRC_IDLE) on the associated BWP. Specifically, based on the invention, the power saving UEs shall implicitly or explicitly monitor the signaling/resource for system information (SI) change indication/public warning system (PWS) indication on the associated BWP during the SDT, for example, CG-SDT or RA-SDT.

Figure 1A:
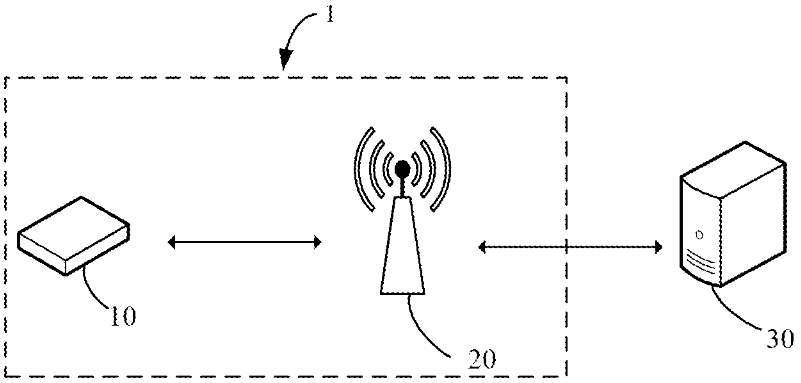
FIG. 1(*a*) is a schematic diagram illustrating a communication controlling system according to an embodiment of the present disclosure.
Figure 1B:
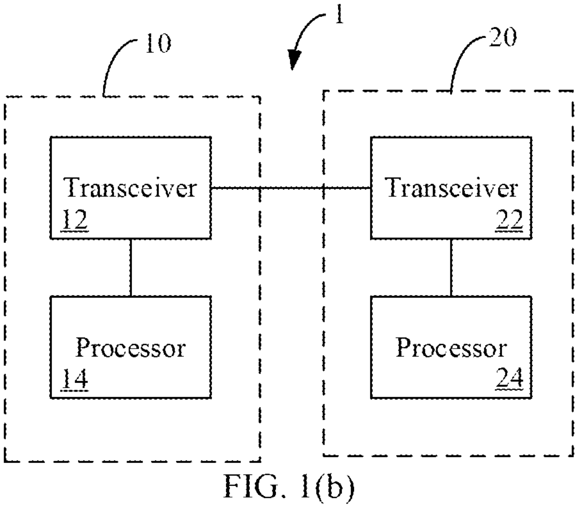

A schematic view and a functional block diagram of a communication controlling system 1 according to the present invention are shown in FIG. 1(*a*) and FIG. 1(*b*) respectively. The communication controlling system 1 includes a user equipment 10 and a base station 20. The user equipment 10 and the base station 20 may communicate with each other either wirelessly or in a wired way. The base station 20 and a next generation core network 30 may also communicate with each other either wirelessly or in a wired way. When the communication controlling system 1 complies with the New Radio (NR) standard of the 3rd Generation Partnership Project (3GPP), the next generation core network (5GCN) 30 is a backend serving network system and may include an Access and Mobility Management Function (AMF), User Plane Function (UPF), and a Session Management Function (SMF).

The user equipment 10 includes a transceiver 12 and a processor 14, which are electrically connected with each other. The base station 20 includes a transceiver 22 and a processor 24, which are electrically connected with each other. The transceiver 12 of the user equipment 10 is configured to transmit a signal to the base station 20 (and receive a signal from the base station 20) and the processor 24 of the base station 20 processes the signal, the transceiver 22 of the base station 20 is configured to transmit a signal to the user equipment 10 (and receive a signal from the user equipment 10) and the processor 14 of the user equipment 10 processes the signal. In this way, the user equipment 10 communicates with the base station 20 each other.

Figure 2:
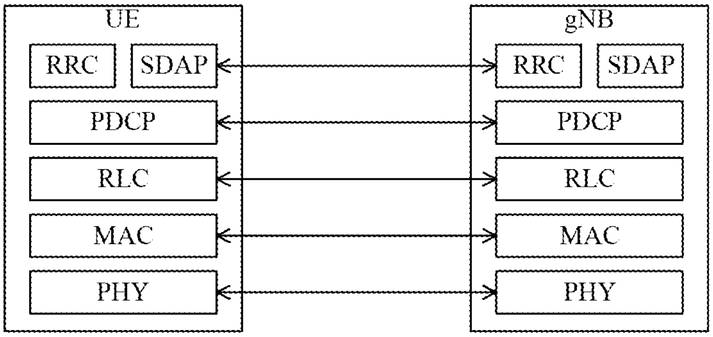
FIG. 2 is a schematic diagram illustrating radio protocol architecture within gNB and UE for SDT.
Figure 3:
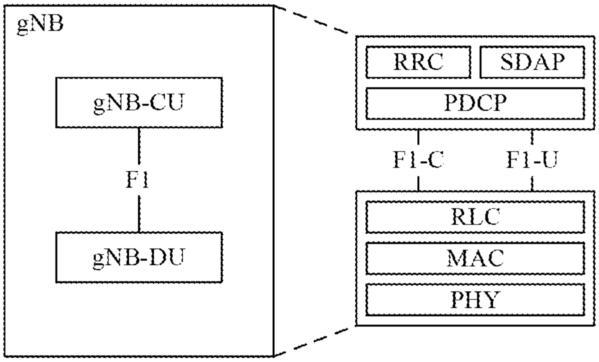
FIG. 3 is a schematic diagram illustrating a gNB further including a centralized unit (CU) and a plurality of distributed unit (DUs).
Figure 4A:
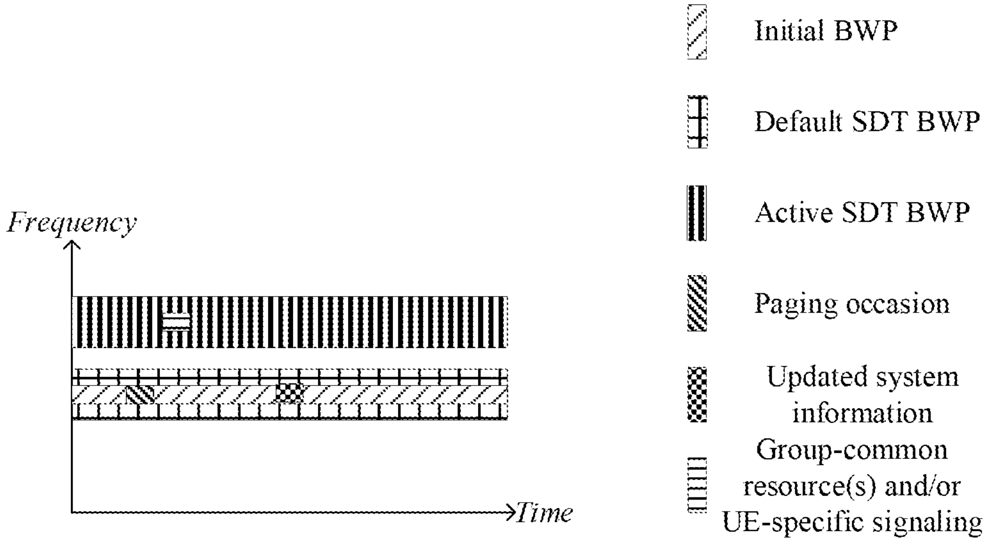
FIG. 4(*a*) is a schematic diagram illustrating a first type of BWP deployment for FDD system.
Figure 4B:
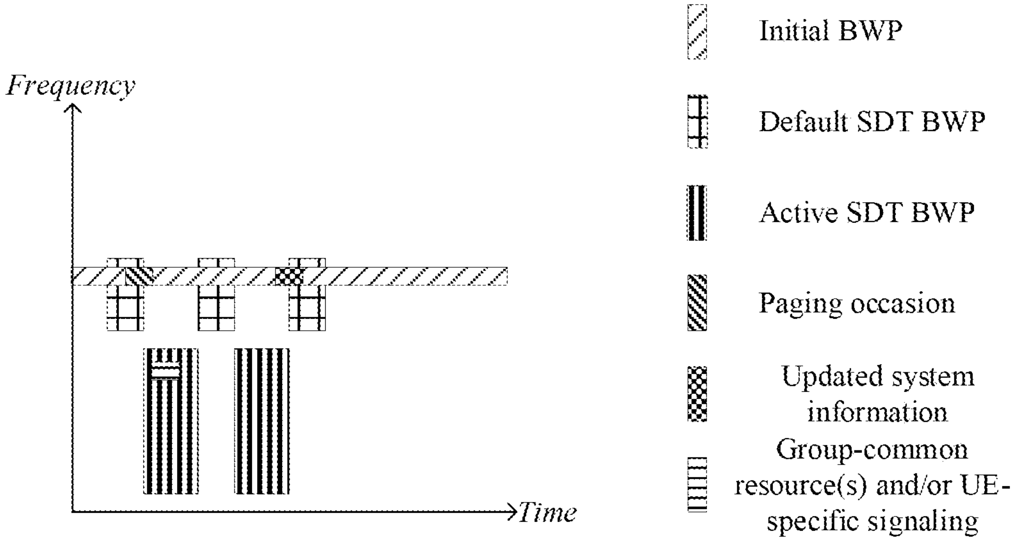
Figure 4C:
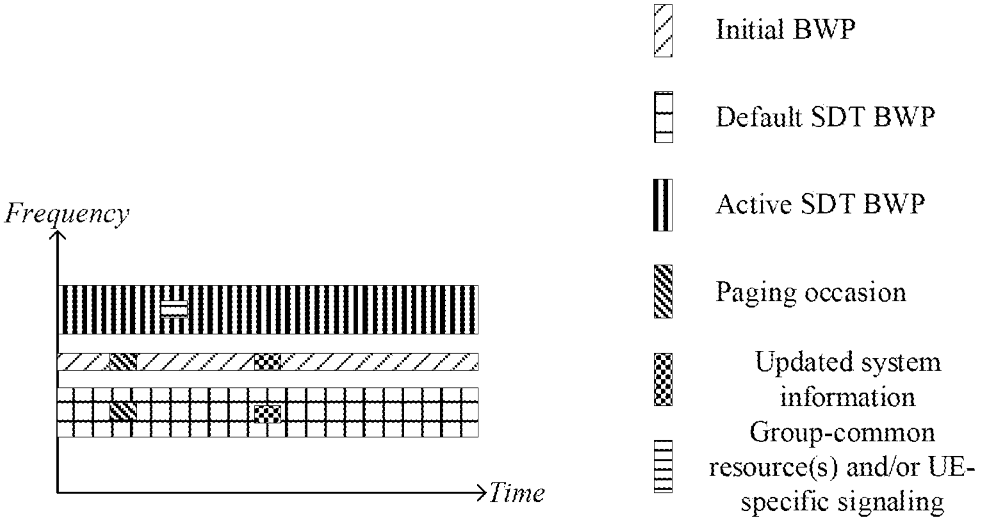
Figure 4D:
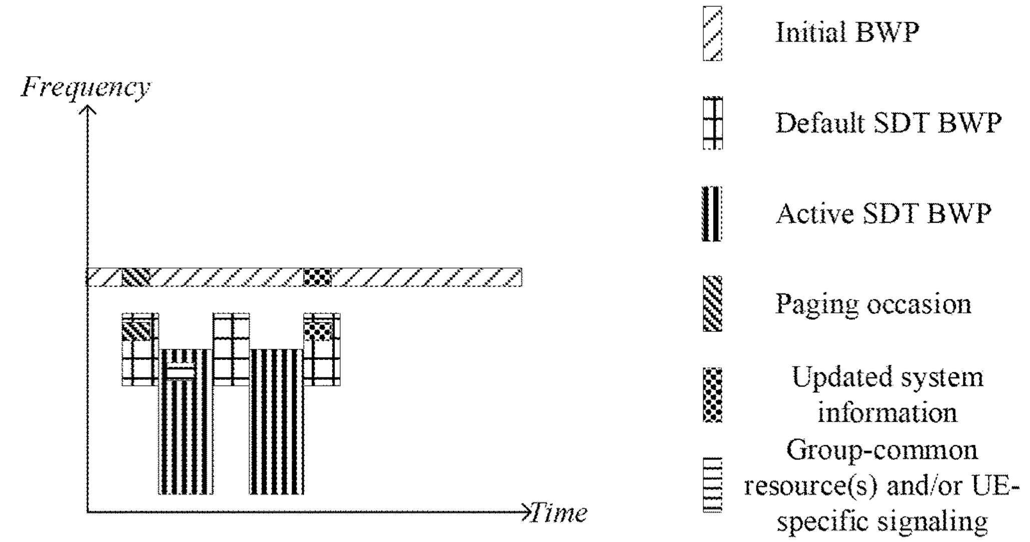
Figure 4E:
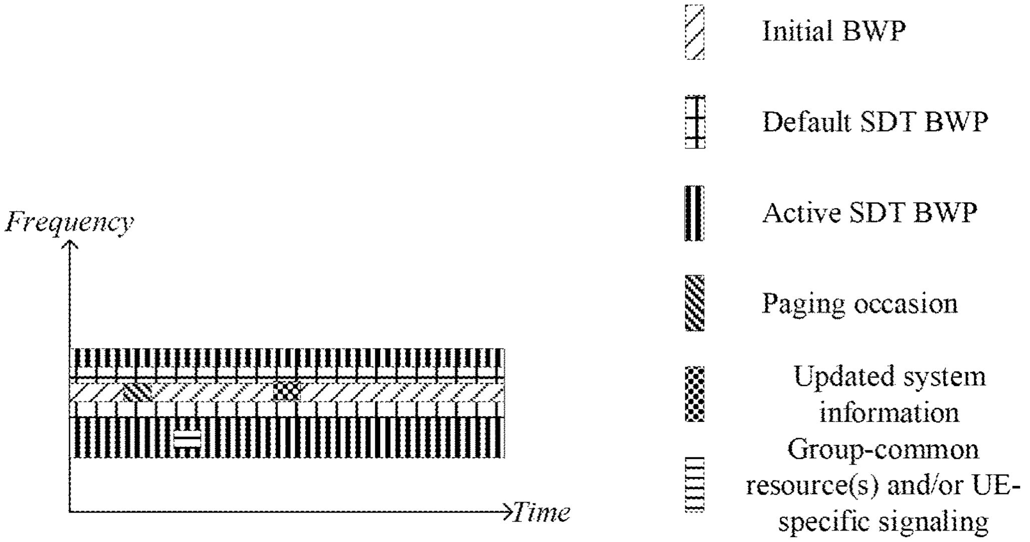
Figure 4F:
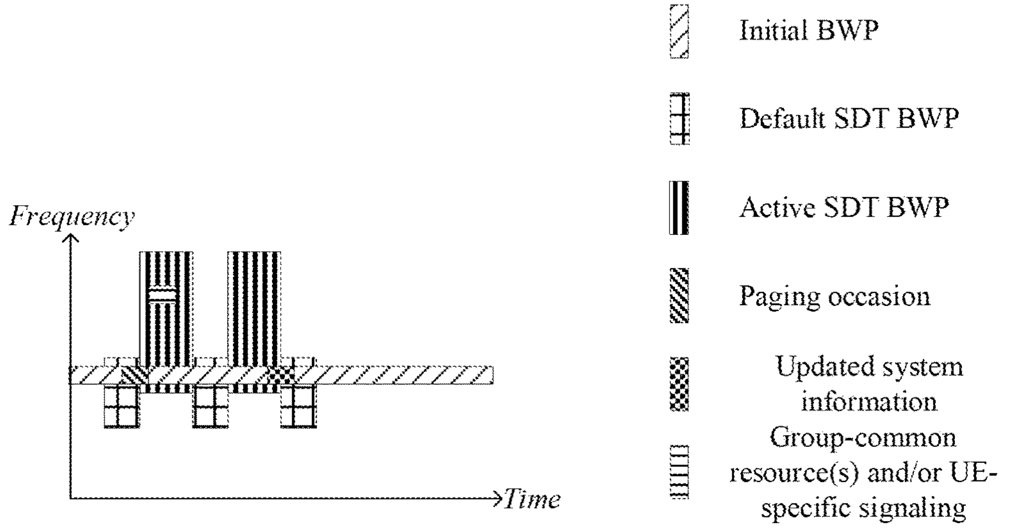

The radio protocol architecture within the base station (gNB) and UE for SDT is shown in FIG. 2, which includes Radio Resource Control (RRC), Service Data Adaptation Protocol (SDAP), Packet Data Convergence Protocol (PDCP), Radio Link Control (RLC), Medium Access Control (MAC). In RAN functional split, the gNB further includes a centralized unit (CU) and a plurality of distributed unit (DUs) as shown in FIG. 3. The protocol stack of CU includes an RRC layer, an optional SDAP layer, and a PDCP layer, while the protocol stack of DU includes an RLC layer, a MAC layer, and a PHY layer. The F1 interface between the CU and DU is established between the PDCP layer of the protocol stack and the RLC layer of the protocol stack.

The bandwidth of the NR system is divided into a plurality of component carriers (CCs). But it is not practical for the UE to perform on the wide bandwidth of the CC (e.g., 400 MHz) since the UE may be required to have a higher bandwidth capability and power consumption of the UE. Each CC may be further divided into a plurality of bandwidth parts (BWPs) to reduce the manufacturing cost of the UE. Each serving cell can configure the UE with one or multiple BWPs, and the maximum number of BWP per serving cell is four BWPs for a given UE, and only one BWP (but not limit to) can be activated at a given time. In other words, in some embodiments of the present invention, there are more than one BWP to be activated at a given time. When the NR system supports SDT with BWP operation, the SDT resources (i.e., the resources for configured grant based small data transmission, CG-SDT and random access based small data transmission, RA-SDT) can be configured on either an initial BWP and/or the separate SDT BWPs.

According to the present invention, the following types of BWP associated with SDT resources are defined:

(a) Initial BWP: The RA-SDT and CG-SDT resources can be configured on the initial BWP. For each power saving UE and serving cell, the network should at least configure the separate preamble groups and configured grant resources for transmitting/receiving small data on an initial UL/DL BWP. The UEs should monitor PDCCH scrambled by Cell-RNTI (C-RNTI) or Inactive-RNTI (I-RNTI) or Paging-RNTI (P-RNTI) or Configured Scheduling-RNTI (CS-RNTI) in the provided common search space, including SearchSpaceZero, SearchSpaceSIB1, SearchSpaceOtherSystemInformation, ra-SearchSpace, pagingSearchSpace (e.g., Type0, 0A, 1, 2, and so on) during RA-SDT or CG-SDT within the initial BWP for receiving system information (SI) change indication/public warning system (PWS) indication. There is a SDT Timing Alignment Timer (TAT) can be started or restarted for keeping UL time alignment during CG-SDT in power saving state. Upon the reception of SDT configuration from the network, i.e., RRCRelease with suspendConfig, the SDT TAT is started. Based on the SDT configuration, the power saving UE may switch to the associated SDT BWP for performing SDT. Upon the reception of SDT Timing Advance Command MAC CE, the SDT TAT is restarted. The power saving UE should release the CG-SDT resources on the initial BWP and may fallback to RA-SDT or perform normal random access on initial BWP when SDT TAT expires in power saving state.

(b) Default SDT BWP: The RA-SDT and CG-SDT resources can be configured on the default SDT BWP. For each power saving UE and serving cell, at least one of the configured SDT preamble groups and configured grant resources could be only used for the power saving UEs during SDT on the default UL/DL SDT BWP. The UEs should monitor PDCCH scrambled by Cell-RNTI (C-RNTI) or Inactive-RNTI (I-RNTI) or Paging-RNTI (P-RNTI) or Configured Scheduling-RNTI (CS-RNTI) in the provided separate common search space, including SearchSpaceSIB1, SearchSpaceOtherSystemInformation, ra-SearchSpace, pagingSearchSpace (e.g., Type0, 0A, 1, 2, and so on) during SDT within the default SDT BWP for receiving SI change indication/PWS indication. If the default SDT BWP is not configured, it would be assumed that the initial BWP is the default SDT BWP. Upon the SDT inactivitytimer expiry, the power saving UE stayed on the other active SDT BWP would automatically switch to the default SDT BWP, if configured; otherwise, switch to the initial BWP for paging/updated system information reception. There is a SDT TAT can be started or restarted for keeping UL time alignment during CG-SDT in power saving state. Upon the reception of SDT configuration from the network, i.e., RRCRelease with suspendConfig, the SDT TAT is started. Based on the SDT configuration, the power saving UE may switch to the associated SDT BWP for performing SDT. Upon the reception of SDT Timing Advance Command MAC CE, the SDT TAT is restarted. The power saving UE should release the CG-SDT resources on the default SDT BWP and may fallback to RA-SDT or perform normal random access on initial BWP when SDT TAT expires in power saving state.

(c) Active SDT BWP: In general, the CG-SDT resources can be configured on the UE-specific active SDT BWP. There is a SDT TAT can be started or restarted for keeping UL time alignment during CG-SDT in power saving state. Upon the reception of SDT configuration from the network, i.e., RRCRelease with suspendConfig, the SDT TAT is started. Based on the SDT configuration, the power saving UE may switch to the associated SDT BWP for performing SDT. Upon the reception of SDT Timing Advance Command MAC CE, the SDT TAT is restarted. The power saving UE should release the CG-SDT resources on the active SDT BWP and may fallback to RA-SDT or perform normal random access on initial BWP when SDT TAT expires in power saving state. In some cases (e.g., congestion control, traffic offload), if the SDT inactivitytimer is running and the CG-SDT resources is released (i.e., released by RRCRelease message or SDT TAT expiry), the RA-SDT can be performed on the UE-specific active SDT BWP. For each power saving UE and serving cell, multiple configurations of the configured grant could be used for the power saving UEs during SDT on the active UL/DL SDT BWP. The UEs should monitor PDCCH scrambled by Cell-RNTI (C-RNTI) or Inactive-RNTI (I-RNTI) or Paging-RNTI (P-RNTI) or Configured Scheduling-RNTI (CS-RNTI) in the provided UE-specific common search space for receiving SI change indication/PWS indication through dedicated signaling/resources (e.g., downlink control information (DCI), short message, information element (IE)) when the SDT related timer is running. Upon the SDT inactivitytimer expiry, the power saving UE would automatically switch to the default SDT BWP, if configured; otherwise, switch to the initial BWP for paging/updated system information reception. It should be noted that the SDT inactivitytimer would be started while the small data is transmitted on the active SDT BWP. If the SDT inactivitytimer is running, the timer would be restarted upon the (re)transmission to accommodate reliable/subsequent SDT procedure. In some cases, the timer would be restarted upon the reception of small data from the network. The SDT inactivitytimer is configured by the network and is associated with the service requirement of the SDT (e.g., data periodicity, service delay budget, etc.).

For RA-SDT, multiple preamble groups (corresponding to the different payload sizes for small data (e.g., in MSGA/MSG3)) may be configured by the network transmitted on the associated SDT BWP. The network can identify the UE's service requirement based on the received preamble, and then provide the associated service for different types of the UE. In some cases, some of preamble groups may be associated with the specific SDT BWPs. The power saving UE can transmit the specific preamble from the SDT preamble groups with the small data on the associated SDT BWP. For example, if the transmitted small data meets a certain SDT threshold (e.g., data volume threshold, RSRP threshold), the specific preamble group would be chosen to transmit (i.e., MSGA/MSG1) on the specific SDT BWP. Furthermore, there is a SDT deactivitytimer is started on the associated SDT BWP upon the initiation of SDT procedure (i.e., upon the transmission/reception of RRCResumeRequest with initial small data for SDT initiation within the associated SDT BWP). In some embodiments, the SDT deactivitytimer is implicitly expired on the associated SDT BWP based on the stored SDT configuration. It should be noted that the SDT deactivitytimer can be configured by the network during SDT configuration (e.g., through RRCRelease with suspendConfig or system information). The SDT deactivitytimer is associated with the SDT paging cycle/paging occasion or system information modification period so that the power saving UE can monitor paging, short message, or system information on the associated BWP before UE initiates SDT for system information update, emergency service. In some embodiments, the SDT deactivitytimer is explicitly stopped or restarted on the associated SDT BWP upon the reception of associated signaling (e.g., piggyback signaling, group-common PDCCH, MCCH, RRCResume, RRCRelease, or RRCReject, etc.) from the network. When the SDT deactivitytimer or the SDT inactivitytimer are not running, the power saving UE would switch to the initial or default SDT BWP for receiving updated system information or performing cell re-selection.

For CG-SDT, multiple configured grant (corresponding to the different payload size of small data) may be configured by the network transmitted on the associated SDT BWP. The network can configure different configuration (e.g., grant size, periodicity) of configurated grant for SDT per BWP. The power saving UE can transmit small data based on a certain SDT threshold (e.g., service requirement delay time threshold, data volume threshold, RSRP threshold) on the associated pre-configured resource within the associated SDT BWP when the SDT TAT is valid. Furthermore, there is a SDT deactivitytimer is started on the associated SDT BWP upon the initiation of SDT procedure (i.e., upon the transmission/reception of initial small data on CG-SDT resource(s) for SDT initiation within the associated SDT BWP). In some embodiments, the SDT deactivitytimer is implicitly expired on the associated SDT BWP based on the stored SDT configuration. It should be noted that the SDT deactivitytimer can be configured by the network during SDT configuration (e.g., through RRCRelease with suspendConfig or system information). The SDT deactivitytimer is associated with the SDT paging cycle/paging occasion or system information modification period so that the power saving UE can monitor paging, short message, or system information on the associated BWP before UE initiates SDT for system information update, emergency service. In some embodiments, the SDT deactivitytimer is explicitly stopped or restarted on the associated SDT BWP upon the reception of associated signaling (e.g., piggyback signaling, group-common PDCCH, MCCH, RRCResume, RRCRelease, or RRCReject, etc.) from the network. When the SDT deactivitytimer or the SDT inactivitytimer are not running, the power saving UE would switch to the initial or default SDT BWP for receiving updated system information or performing cell re-selection.

When SDT resource(s) (i.e., CG-SDT and/or RA-SDT) can be configured on active SDT BWPs, configured by system information and/or RRC message, the power saving UE needs to monitor the signaling (e.g., paging, short message) for system information update, emergency service, and so on. If the pagingSearchSpace is not configured within the active SDT BWP, the power saving UEs should monitor group-common resource(s) (e.g., PDCCH, DCI, MCCH) or UE-specific signaling (e.g., RRCRelease, RRCReject) for receiving updated system information through the received SI change indication/PWS indication based on the operations of SDT related timer(s). FIG. 4 shows the paging message and updated system information can be transmitted on the initial BWP and/or default SDT BWP in Frequency Division Duplex (FDD) or Time Division Duplex (TDD) system. The group-common resource(s) and/or UE-specific signaling with SI change indication/PWS indication is transmitted on the active SDT BWP as shown in FIG. 4, if necessary.

In FIG. 4(*a*), the SDT resource can be configured on initial BWP/default SDT BWP/active SDT BWP operated on paired spectrum for FDD system. The default SDT BWP at least partially contains the initial BWP. FIG. 4(*a*) shows the default SDT BWP fully contains the initial BWP, but not limited to. The active SDT BWP is a separate BWP other than the default SDT BWP. The SI change indication/PWS indication can be transmitted with paging occasion, group-common resource(s) and/or UE-specific signaling on the associated BWP, if necessary. Upon the reception of SI change indication/PWS indication, the power saving UE can switch to either the initial BWP or the default SDT BWP based on the SDT related timer operation for receiving the updated system information.

In FIG. 4(*b*), the SDT resource can be configured on initial BWP/default SDT BWP/active SDT BWP operated on unpaired spectrum for TDD system. The default SDT BWP at least partially contains the initial BWP. FIG. 4(*b*) shows the default SDT BWP partially contains the initial BWP, but not limited to. The power saving UE can periodically switch the BWPs between the default SDT and active SDT BWP based on the SDT requirement or network configuration. The SI change indication/PWS indication can be transmitted with paging occasion, group-common resource(s) and/or UE-specific signaling on the associated BWP, if necessary. Upon the reception of SI change indication/PWS indication, the power saving UE can switch to either the initial BWP or the default SDT BWP based on the SDT related timer operation for receiving the updated system information.

In FIG. 4(*c*), the SDT resource can be configured on initial BWP/default SDT BWP/active SDT BWP operated on paired spectrum for FDD system. The default SDT BWP does not contain the initial BWP. FIG. 4(*c*) shows the network can transmit the paging message/updated system information on the initial BWP and default SDT BWP. The active SDT BWP is a separate BWP other than the default SDT BWP. The SI change indication/PWS indication can be transmitted with paging occasion, group-common resource(s) and/or UE-specific signaling on the associated BWP, if necessary. Upon the reception of SI change indication/PWS indication, the power saving UE can switch to either the initial BWP or the default SDT BWP based on the SDT related timer operation for receiving the updated system information.

In FIG. 4(*d*), the SDT resource can be configured on initial BWP/default SDT BWP/active SDT BWP operated on unpaired spectrum for TDD system. The default SDT BWP does not contain the initial BWP. FIG. 4(*d*) shows the network can transmit the paging message/updated system information on the initial BWP and default SDT BWP. The power saving UE can periodically switch the BWPs between the default SDT and active SDT BWP based on the SDT requirement or network configuration. The SI change indication/PWS indication can be transmitted with paging occasion, group-common resource(s) and/or UE-specific signaling on the associated BWP, if necessary. Upon the reception of SI change indication/PWS indication, the power saving UE can switch to either the initial BWP or the default SDT BWP based on the SDT related timer operation for receiving the updated system information.

In FIG. 4(*e*), the SDT resource can be configured on initial BWP/default SDT BWP/active SDT BWP operated on paired spectrum for FDD system. The default SDT BWP and active SDT BWP at least partially contain the initial BWP. FIG. 4(*e*) shows the default SDT BWP and active SDT BWP fully contain the initial BWP, but not limited to. The active SDT BWP is a wider BWP than the default SDT BWP provides more SDT resources than the default SDT BWP. The network can transmit the paging message/updated system information on the initial BWP. The SI change indication/PWS indication can be transmitted with paging occasion, group-common resource(s) and/or UE-specific signaling on the associated BWP, if necessary. Upon the reception of SI change indication/PWS indication, the power saving UE can wait for receiving the updated system information based on the SDT related timer operation.

In FIG. 4(*f*), the SDT resource can be configured on initial BWP/default SDT BWP/active SDT BWP operated on unpaired spectrum for TDD system. The default SDT BWP and active SDT BWP at least partially contain the initial BWP. FIG. 4(*f*) shows the default SDT BWP and active SDT BWP partially contain the initial BWP, but not limited to. The active SDT BWP is a wider BWP than the default SDT BWP provides more SDT resources than the default SDT BWP. The network can transmit the paging message/updated system information on the initial BWP. The power saving UE can periodically switch the BWPs between the default SDT and active SDT BWP based on the SDT requirement or network configuration. The SI change indication/PWS indication can be transmitted with paging occasion, group-common resource(s) and/or UE-specific signaling on the associated BWP, if necessary. Upon the reception of SI change indication/PWS indication, the power saving UE can wait for receiving the updated system information based on the SDT related timer operation.

Figure 5:
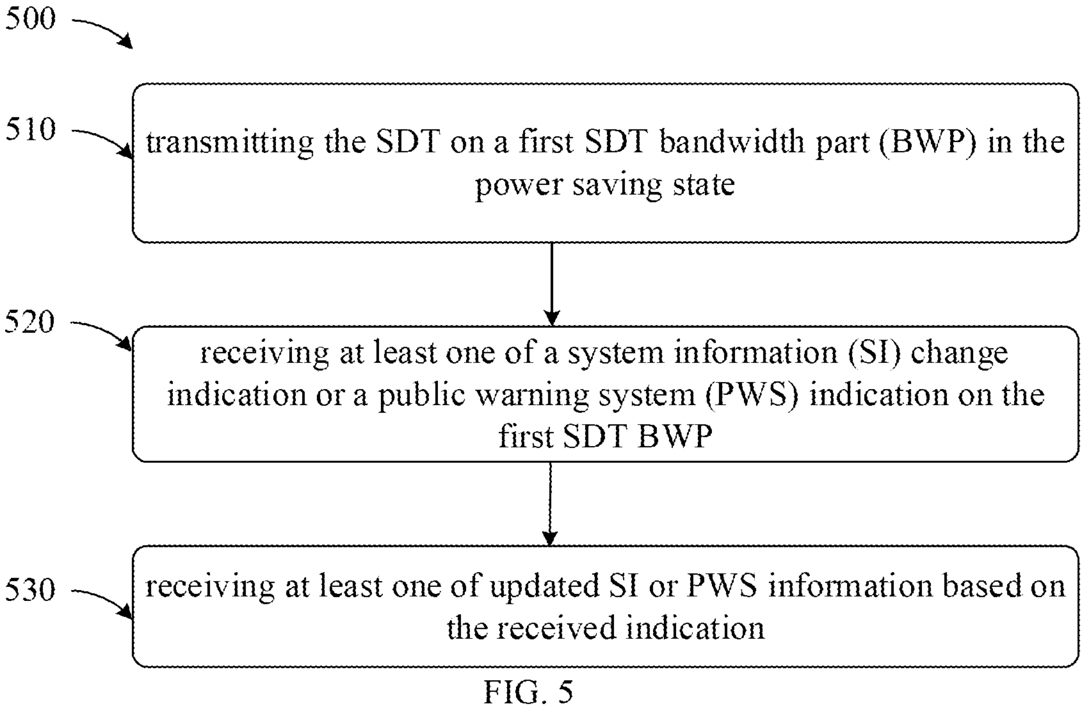
FIG. 5 is a flowchart of a method for small data transmission in a power saving state according to an embodiment of the present disclosure.

FIG. 5 illustrates a method 500 for small data transmission in a power saving state according to an embodiment of the present disclosure. The method 500 is performed by a user equipment (UE) in a network. The method 500 may include the following steps.

In Block 510, UE transmits small data transmission (SDT) on a first SDT bandwidth part (BWP) in power saving state. The UE may communicate with a base station (BS) to transmit the SDT to the BS. The transmitted SDT may be random access (RA)-SDT or configured grant (CG)-SDT as described above. For the RA-SDT, configured SDT preamble group is used for the UE during the SDT in the power saving sate, and the UE may be configured by the BS or network with at least one of multiple preamble groups corresponding to different payload sizes of small data (in MSGA or MSG3), satisfying the needs of transmitting different sizes of data in the SDT. For the CG-SDT, configured grant resource is used for the UE during the SDT in the power saving sate, and the UE may be configured by the BS or network with at least one of multiple configurations corresponding to different payload sizes of small data, satisfying the needs of transmitting different sizes of data in the SDT. This transmission may be on an initial BWP, a default SDT BWP or an active SDT BWP. As defined, the initial BWP is initially set for the SDT in the power saving state, the active SDT BWP is a SDT BWP currently activated for the SDT, and the default SDT BWP if configured is a SDT BWP to which the active SDT BWP automatically switches when the active SDT BWP is deactivated. If the default SDT BWP is not configured or not supported, the active SDT BWP, when deactivated, may automatically switch to the initial BWP. The initial BWP, the default SDT BWP and the active SDT BWP may be configured as those shown in FIG. 4, and one or more than one of the deployments of FIG. 4 may be supported or used in communication protocols. Specifically, these BWPs are operated on paired spectrum for frequency division duplex (FDD) system (as shown in FIGS. 4(*a*), 4(*c*) and 4(*e*)) or are operated on paired spectrum for time division duplex (TDD) system (as shown in FIGS. 4(*b*), 4(*d*) and 4(*f*)). The default SDT BWP at least partially contains the initial BWP (as shown in FIGS. 4(*a*) and 4(*b*)), or the default SDT BWP does not contain the initial BWP (as shown in FIGS. 4(*c*) and 4(*d*)), or the default SDT BWP and active SDT BWP at least partially contain the initial BWP (as shown in FIGS. 4(*e*) and 4(*f*)). The active SDT BWP is a separate BWP other than the default SDT BWP (as shown in FIGS. 4(*a*), 4(*b*) and 4(*c*)), or the active SDT BWP is a wider BWP than the default SDT BWP and provides more SDT resources than the default SDT BWP (as shown in FIGS. 4(*a*) to 4(*f*)).

In Block 520, the UE receives from the BS or network at least one of a system information (SI) change indication or a public warning system (PWS) indication on the first SDT BWP. The SI change indication indicates a SI change for the UE to update the SI. The PWS indication indicates the UE to receive PWS information. In some embodiments, the UE may monitor the SI change indication or the PWS indication on a paging occasion. If configured on associated BWP by the BS or network, the UE may monitor pagingSearchSpace (e.g., Type0, 0A, 1, 2, and so on) during RA-SDT or CG-SDT for reception of the aforesaid indication. In some embodiments, the UE may receive the SI change indication or the PWS indication on group-common resource(s) (e.g., PDCCH, DCI, MCCH) or via UE-specific signaling (e.g., RRCRelease, RRCReject). In a first exemplary example, the SI change indication or the PWS indication is piggybacked on downlink (DL) data. In a second exemplary example, the SI change indication or the PWS indication is indicated by a downlink control information (DCI) format transmitted on group-common physical downlink control channel (PDCCH). In a third exemplary example, the SI change indication or the PWS indication is transmitted on multicast control channel (MCCH) if the UE has an ability to transmit UL small data and receive multicast service data during the SDT. In a fourth exemplary example, the SI change indication or the PWS indication is indicated by a BWP switching information element (IE) of a radio resource control (RRC) signaling. In a fifth exemplary example, the SI change indication or the PWS indication is indicated by a suspend configuration IE of a RRC signaling. The aforesaid indication may be received on the initial BWP, the default SDT BWP or the activate SDT BWP via any type of above transmissions each of the BWPs supports or being configured by the BS or network.

In Block 530, the UE receives from the BS or network at least one of updated SI or PWS information based on the received indication. The UE may receive the updated SI indicated by the SI change indication. The UE may receive the PWS information indicated by the PWS indication. Both the transmissions of the updated SI and the PWS information may be supported by the UE during SDT. In some embodiments, the updated SI or the PWS information may be received on a same SDT BWP on which associated indication is received. That is, both the received indication and associated information are received on a same SDT BWP, which can be the initial BWP, the default SDT BWP or the activate SDT BWP. This allows the UE to monitor and update SI change or receive PWS information on any of these SDT BWPs. Transmission of the indication prior to updating SI or receiving PWS may help reduce UE power consumption, and this may also give the network a great flexibility on resource allocation. In some embodiments, the updated SI or the PWS information may be received on a SDT BWP different from that on which associated indication is received. For example, the SI change indication or the PWS indication is received on a first SDT BWP, and the updated SI or the PWS information is received on a second SDT BWP. Upon reception of the at least one of the SI change indication or the PWS indication, the UE may switch from the first SDT BWP to the second SDT BWP for receiving the updated SI indicated by the SI change indication or receiving the PWS information indicated by the PWS indication. Once receiving the indication, the UE may switch to a SDT BWP that occupies less frequency/time-domain resources to receive the updated SI or the PWS information. Generally, the activate SDT BWP consumes more SDT resources, and then the default SDT BWP, and then the initial BWP. In a first exemplary example, the second SDT BWP is the initial BWP and the first SDT BWP is the active SDT BWP, that is, switching from the active SDT BWP to the initial BWP for the information reception. In a second exemplary example, the second SDT BWP is the initial BWP and the first SDT BWP is the default SDT BWP, that is, switching from the default SDT BWP to the initial BWP for the information reception. In a third exemplary example, the second SDT BWP is the default SDT BWP and the first SDT BWP is the active SDT BWP, that is, switching from the active SDT BWP to the default BWP for the information reception. This allows the UE to receive small data (e.g., the SI or PWS information) on less SDT resources.

With the proposed method 500 illustrated above, the invention can solve issues in the prior art, monitor system information change and/or public warning system information on associated BWP during the SDT, improve resource efficiency, improve power consumption and signaling overhead, and/or provide a good communication performance.

In some embodiments, one or more than one SDT related timer may be involved in the mechanism of small data (e.g., the SI or PWS information) reception. The SDT related timer may be a SDT timing alignment timer (TAT), a SDT deactivity timer or a SDT inactivity timer. The SDT TAT is for keeping uplink (UL) time alignment with the BS or network during the SDT in the power saving state. The SDT deactivity timer is associated with SDT paging cycle/paging occasion or system information modification period. The SDT inactivity timer is associated with SDT characteristic in the power saving state. In one embodiment, if at least one SDT related timer is not running on an associated SDT BWP, the UE may monitor the SI change indication or the PWS indication on a paging occasion. The indication monitoring may be performed on a current SDT BWP. In addition, the reception of updated SI or PWS information may be performed on the current SDT BWP or may be on a different SDT BWP. In one embodiment, if at least one SDT related timer is not running on a current SDT BWP (e.g., the first SDT BWP), the UE may switch from the current SDT BWP to a next SDT BWP (e.g., the second SDT BWP) for receiving the updated SI or the PWS information. The indication monitoring may be performed on the next SDT BWP switched from the current SDT BWP. For example, if at least one of the SDT TAT, the SDT deactivity timer or the SDT inactivity timer is not running on the first SDT BWP, the UE may switch from the first SDT BWP to the second SDT BWP for monitoring the SI change indication or the PWS indication on a paging occasion, and receive the updated SI indicated by the SI change indication or the PWS information indicated by the PWS indication. In this case, for example, the UE may switch from the active SDT BWP to the initial SDT BWP, or the default SDT BWP if configured. In one embodiment, the aforesaid indication may cause the SDT related timer to be stopped such that the SDT BWP switching is performed. For example, upon reception of the SI change indication or the PWS indication, the UE may stop the SDT deactivity timer to switch to the second SDT BWP for receiving the updated SI or the PWS information. The SDT deactivity timer may be configured by the BS or network for deactivating or postponing small data transmission on an associate SDT BWP. In one embodiment, the mechanism may take the SDT inactivity timer into consideration. The SDT inactivity timer may be configured by the BS or network for a SDT session or one SDT data transmission. The UE may determine to switch to the second SDT BWP if the SDT inactivity timer is not running. In another example, upon reception of the SI change indication or the PWS indication, no matter whether the SDT inactivity timer is running (that is, no matter whether one SDT data transmission is completed or not), the UE switches to the second SDT BWP, and after reception of the updated SI or the PWS information, the UE switches back to the first SDT BWP for proceeding the SDT for the uncompleted transmission. In still another example, the UE may complete an ongoing SDT with a priority higher than a threshold (which may be configured by the BS or network) until an expiry of the SDT inactivity timer. That is, the ongoing SDT is performed until the transmission is completed, before the SDT BWP switching. If the SDT inactivity timer is running and CG-SDT resources for the SDT is released, the UE may perform RA-SDT. In one embodiment, the mechanism may take the SDT TAT into consideration. Upon an expiry of the SDT TAT in the power saving state, the UE may release CG-SDT resources on the first SDT BWP and switch to the second SDT BWP for receiving the updated SI or the PWS information. If the SDT TAT expires, the UE may release CG-SDT resources, and fall back to RA-SDT or perform normal random access.

Figure 6:
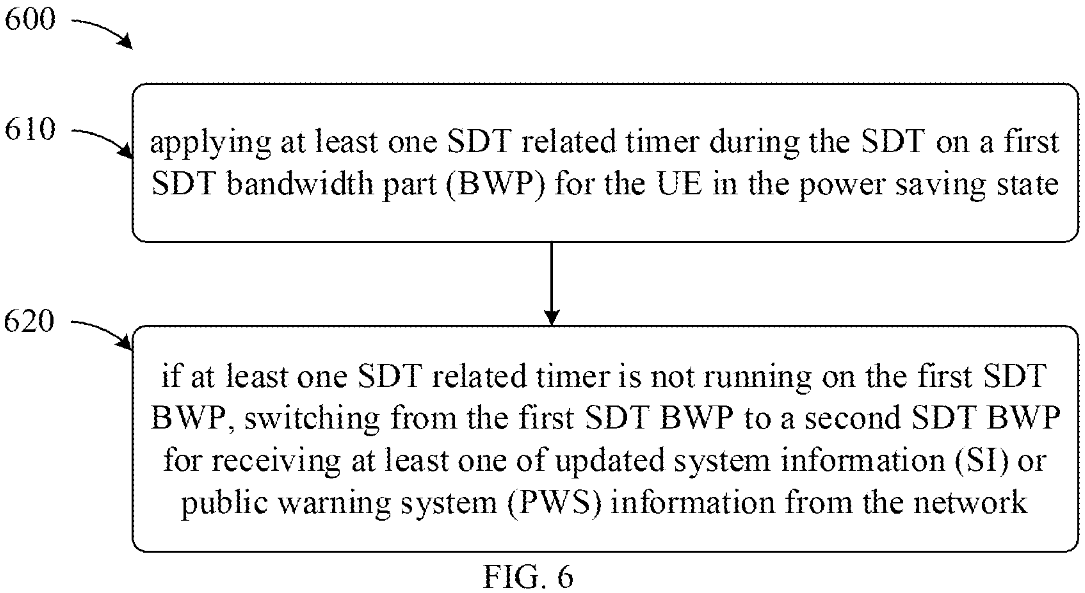
FIG. 6 is a flowchart of a method for small data transmission in a power saving state according to another embodiment of the present disclosure.

FIG. 6 illustrates a method 600 for small data transmission in a power saving state according to another embodiment of the present disclosure. The method 600 is performed by a user equipment (UE) in a network. The method 600 may include the following steps.

In Block 610, the UE applies at least one SDT related timer during the SDT on a first SDT bandwidth part (BWP) for the UE in the power saving state. The UE may communicate with a base station (BS) to transmit the SDT to the BS. The transmitted SDT may be random access (RA)-SDT or configured grant (CG)-SDT as described above. For the RA-SDT, configured SDT preamble group is used for the UE during the SDT in the power saving sate, and the UE may be configured by the BS or network with at least one of multiple preamble groups corresponding to different payload sizes of small data (in MSGA or MSG3), satisfying the needs of transmitting different sizes of data in the SDT. For the CG-SDT, configured grant resource is used for the UE during the SDT in the power saving sate, and the UE may be configured by the BS or network with at least one of multiple configurations corresponding to different payload sizes of small data, satisfying the needs of transmitting different sizes of data in the SDT. The SDT related timer may be configured by the BS or network. The SDT related timer may be a SDT timing alignment timer (TAT), a SDT deactivity timer or a SDT inactivity timer. The SDT TAT is for keeping uplink (UL) time alignment with the BS or network during the SDT in the power saving state. The SDT deactivity timer is associated with SDT paging cycle/paging occasion or system information modification period. The SDT deactivity timer may be configured by the BS or network for deactivating or postponing small data transmission on an associate SDT BWP. The SDT inactivity timer is associated with SDT characteristic in the power saving state. The SDT inactivity timer may be configured by the BS or network for a SDT session or one SDT data transmission. The SDT related timer is applied during the SDT on an associated SDT BWP. This small data transmission may be on an initial BWP, a default SDT BWP or an active SDT BWP (the aforesaid first SDT BWP may be any one of these BWPs). As defined, the initial BWP is initially set for the SDT in the power saving state, the active SDT BWP is a SDT BWP currently activated for the SDT, and the default SDT BWP if configured is a SDT BWP to which the active SDT BWP automatically switches when the active SDT BWP is deactivated. If the default SDT BWP is not configured or not supported, the active SDT BWP, when deactivated, may automatically switch to the initial BWP. The initial BWP, the default SDT BWP and the active SDT BWP may be configured as those shown in FIG. 4, and one or more than one of the deployments of FIG. 4 may be supported or used in communication protocols. Specifically, these BWPs are operated on paired spectrum for frequency division duplex (FDD) system (as shown in FIGS. 4(*a*), 4(*c*) and 4(*e*)) or are operated on paired spectrum for time division duplex (TDD) system (as shown in FIGS. 4(*b*), 4(*d*) and 4(*f*)). The default SDT BWP at least partially contains the initial BWP (as shown in FIGS. 4(*a*) and 4(*b*)), or the default SDT BWP does not contain the initial BWP (as shown in FIGS. 4(*c*) and 4(*d*)), or the default SDT BWP and active SDT BWP at least partially contain the initial BWP (as shown in FIGS. 4(*e*) and 4(*f*)). The active SDT BWP is a separate BWP other than the default SDT BWP (as shown in FIGS. 4(*a*), 4(*b*) and 4(*c*)), or the active SDT BWP is a wider BWP than the default SDT BWP and provides more SDT resources than the default SDT BWP (as shown in FIGS. 4(*a*) to 4(*f*)).

In Block 620, if at least one SDT related timer is not running on the first SDT BWP, the UE switches from the first SDT BWP to a second SDT BWP for receiving at least one of updated system information (SI) or public warning system (PWS) information from the network. If at least one SDT related timer is not running on a current SDT BWP, it means it is likely that the UE may not need the SDT for data transmission any more, and meanwhile the UE may switch to a SDT BWP that occupies less frequency/time-domain resources to receive the updated SI or the PWS information. Generally, the activate SDT BWP consumes more SDT resources, and then the default SDT BWP, and then the initial BWP. In a first exemplary example, the second SDT BWP is the initial BWP and the first SDT BWP is the active SDT BWP, that is, switching from the active SDT BWP to the initial BWP for the information reception. In a second exemplary example, the second SDT BWP is the initial BWP and the first SDT BWP is the default SDT BWP, that is, switching from the default SDT BWP to the initial BWP for the information reception. In a third exemplary example, the second SDT BWP is the default SDT BWP and the first SDT BWP is the active SDT BWP, that is, switching from the active SDT BWP to the default BWP for the information reception. This realizes the SI updating or PWS information reception on associated BWP during SDT and allows the UE to receive small data (e.g., the SI or PWS information) on less SDT resources at least for the sake of power saving. In this Block, one or more than one SDT related timer are involved in the mechanism of small data (e.g., the SI or PWS information) reception. In one embodiment, if at least one SDT related timer is not running on a current SDT BWP (e.g., the first SDT BWP), the UE may switch from the current SDT BWP to a next SDT BWP (e.g., the second SDT BWP) for receiving the updated SI or the PWS information. In this mechanism, a SI change indication or a PWS indication from the BS or network may be taken into consideration. The SI change indication indicates a SI change for the UE to update the SI. The PWS indication indicates the UE to receive PWS information. For example, if at least one of the SDT TAT, the SDT deactivity timer or the SDT inactivity timer is not running on the first SDT BWP, the UE may switch from the first SDT BWP to the second SDT BWP for monitoring the SI change indication or the PWS indication on a paging occasion, and receive the updated SI indicated by the SI change indication or the PWS information indicated by the PWS indication. The SI change indication or the PWS indication is received on the second SDT BWP after switching to the second SDT BWP and before reception of the updated SI or PWS information. In this case, for example, the UE may switch from the active SDT BWP to the initial SDT BWP, or the default SDT BWP if configured. In one embodiment, the aforesaid indication may cause the SDT related timer to be stopped such that the SDT BWP switching is performed. For example, before switching to the second SDT BWP, upon reception of the SI change indication or the PWS indication, the UE may stop the SDT deactivity timer to switch to the second SDT BWP for receiving the updated SI or the PWS information. In one embodiment, the mechanism may take the SDT inactivity timer into consideration. The UE may determine to switch to the second SDT BWP if the SDT inactivity timer is not running. In another example, upon reception of the SI change indication or the PWS indication, no matter whether the SDT inactivity timer is running (that is, no matter whether one SDT data transmission is completed or not), the UE switches to the second SDT BWP, and after reception of the updated SI or the PWS information, the UE switches back to the first SDT BWP for proceeding the SDT for the uncompleted transmission. In still another example, the UE may complete an ongoing SDT with a priority higher than a threshold (which may be configured by the BS or network) until an expiry of the SDT inactivity timer. That is, the ongoing SDT is performed until the transmission is completed, before the SDT BWP switching. If the SDT inactivity timer is running and CG-SDT resources for the SDT is released, the UE may perform RA-SDT. In one embodiment, the mechanism may take the SDT TAT into consideration. Upon an expiry of the SDT TAT in the power saving state, the UE may release CG-SDT resources on the first SDT BWP and switch to the second SDT BWP for receiving the updated SI or the PWS information. If the SDT TAT expires, the UE may release CG-SDT resources, and fall back to RA-SDT or perform normal random access.

In some embodiments, the updated SI or the PWS information may be received on a SDT BWP different from that on which associated indication is received. For example, the SI change indication or the PWS indication is received on a first SDT BWP, and the updated SI or the PWS information is received on a second SDT BWP. Upon reception of the SI change indication or the PWS indication to stop the SDT related timer, the UE may switch from the first SDT BWP to the second SDT BWP for receiving the updated SI indicated by the SI change indication or receiving the PWS information indicated by the PWS indication. In some embodiments, the updated SI or the PWS information may be received on a same SDT BWP on which associated indication is received. For example, if the SDT related timer is not running, after the SDT BWP switching is performed, both the indication and associated information are received on a same SDT BWP, which can be the initial BWP, the default SDT BWP or the activate SDT BWP. This allows the UE to monitor and update SI change or receive PWS information on any of these SDT BWPs. Transmission of the indication prior to updating SI or receiving PWS may help reduce UE power consumption, and this may also give the network a great flexibility on resource allocation. In some embodiments, no matter whether the SDT related timer is running, upon reception of the SI change indication or the PWS indication, the UE switches from the first SDT BWP to the second SDT BWP for receiving the updated SI indicated by the SI change indication or the PWS information indicated by the PWS indication. That is, the SDT BWP switching may depend only on whether the SI change indication or the PWS indication is received, and may be independent from the SDT related timer.

In some embodiments, the UE may monitor the SI change indication or the PWS indication on a paging occasion. If configured on associated BWP by the BS or network, the UE may monitor pagingSearchSpace (e.g., Type0, 0A, 1, 2, and so on) during RA-SDT or CG-SDT for reception of the aforesaid indication. In some embodiments, the UE may receive the SI change indication or the PWS indication on group-common resource(s) (e.g., PDCCH, DCI, MCCH) or via UE-specific signaling (e.g., RRCRelease, RRCReject). In a first exemplary example, the SI change indication or the PWS indication is piggybacked on downlink (DL) data. In a second exemplary example, the SI change indication or the PWS indication is indicated by a downlink control information (DCI) format transmitted on group-common physical downlink control channel (PDCCH). In a third exemplary example, the SI change indication or the PWS indication is transmitted on multicast control channel (MCCH) if the UE has an ability to transmit UL small data and receive multicast service data during the SDT. In a fourth exemplary example, the SI change indication or the PWS indication is indicated by a BWP switching information element (IE) of a radio resource control (RRC) signaling. In a fifth exemplary example, the SI change indication or the PWS indication is indicated by a suspend configuration IE of a RRC signaling. The aforesaid indication may be received on the initial BWP, the default SDT BWP or the activate SDT BWP via any type of above transmissions each of the BWPs supports or being configured by the BS or network.

With the proposed method 600 illustrated above, the invention can solve issues in the prior art, monitor system information change and/or public warning system information on associated BWP during the SDT, improve resource efficiency, improve power consumption and signaling overhead, and/or provide a good communication performance.

Figure 7:
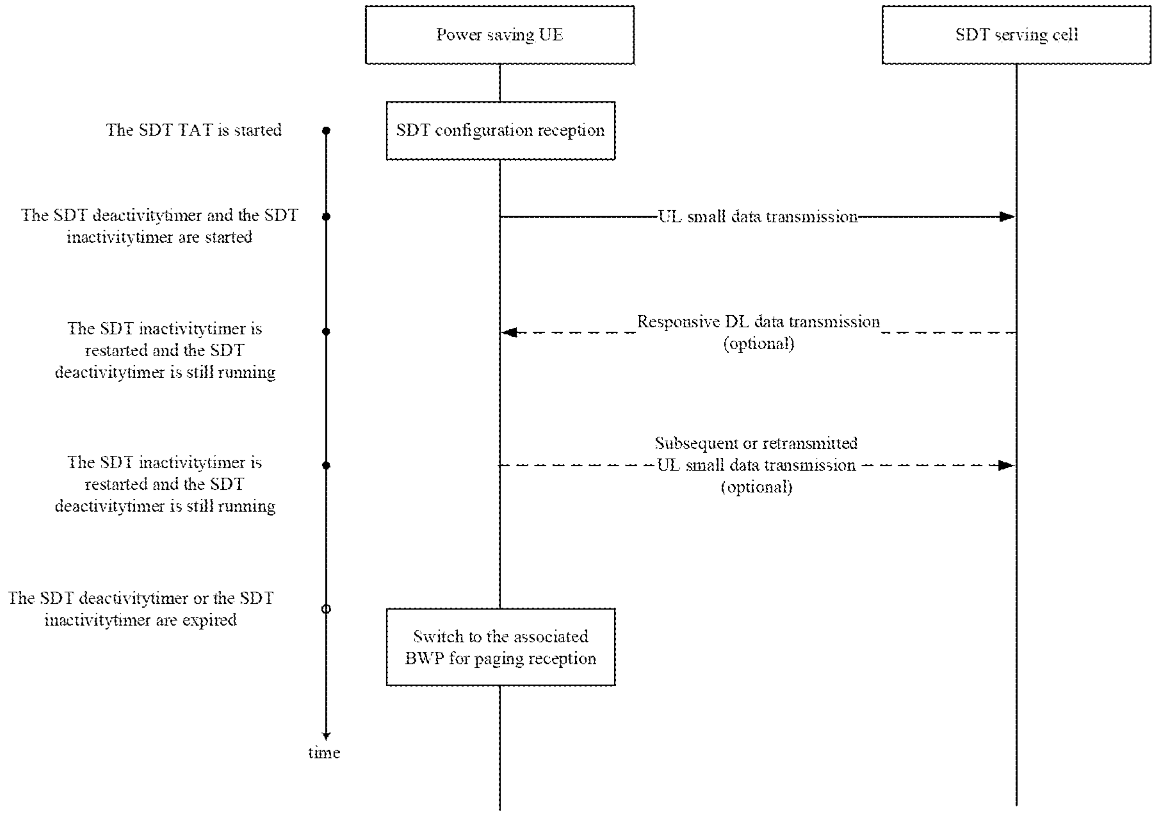
FIG. 7 is a flowchart of a SDT method according to a first embodiment of the present disclosure.

FIG. 7 illustrates a first embodiment of the present disclosure as described below.

Based on the scenarios depicted in FIG. 4, FIG. 7 shows a power saving UE performs implicitly timer-based system information update/change during SDT between BWPs. There is a SDT TAT started or restarted for keeping UL time alignment during CG-SDT in power saving state. Upon the reception of SDT configuration from the network, e.g., RRCRelease with suspendConfig, the SDT TAT is started. Based on the SDT configuration, the power saving UE may switch to the associated SDT BWP for performing SDT. Upon the reception of SDT Timing Advance Command MAC CE, the SDT TAT is restarted. The power saving UE should release the CG-SDT resources on the associated BWP and may fallback to RA-SDT or perform normal random access on initial BWP when SDT TAT expires in power saving state. In some cases, upon the expiry of SDT TAT, the power saving UE should release the CG-SDT resources on the associated BWP and switch to initial BWP/default SDT BWP for monitoring paging occasion.

There is a SDT deactivitytimer associated with the SDT paging cycle/paging occasion. The SDT deactivitytimer is started on the associated SDT BWP upon the transmission/reception of initial small data on CG-SDT resource(s) within the associated SDT BWP as shown in FIG. 7. In RA-SDT, the SDT deactivitytimer is started on the associated SDT BWP upon the transmission/reception of RRC message (e.g., RRCResumeRequest) with initial small data within the associated SDT BWP (not shown). And the SDT inactivitytimer would be started while the initial small data is transmitted on the associated SDT BWP.

During the running of SDT deactivitytimer, when the responsive DL data is received or the subsequent/retransmitted UL small data is transmitted, the SDT inactivitytimer would be restarted. In some cases (e.g., small data transmission complete), upon the SDT inactivitytimer expiry, the power saving UE would switch to the default SDT BWP, if configured; otherwise, switch to the initial BWP for monitoring paging occasion. In some other cases (e.g., there is no more small data transmission/reception during the running of SDT deactivitytimer), upon the SDT deactivitytimer expiry, the power saving UE would switch to the initial BWP for receiving SI change indication/PWS indication via paging occasion or performing cell re-selection. It means that the power saving UE should switch to the initial BWP upon at most the expiry of SDT deactivitytimer for paging/short message reception. In some further cases (e.g., data arriving at UL TX buffer after the SDT deactivitytimer is expired, the expiry of SDT deactivitytimer but running of SDT inactivitytimer), if the power saving UE switches from active SDT BWP to initial or default SDT BWP, upon the reception of paging/updated system information/emergency information, it would switch back to the active SDT BWP for proceeding SDT (not shown).

From the power saving UE's point of view, when the SDT TAT, SDT deactivitytimer or SDT inactivitytimer are not running on the associated SDT BWP, the power saving UE would switch to the initial or default SDT BWP for receiving SI change indication/PWS indication based on the network configuration. As a result, the paging message/short message (including SI change indication/PWS indication, etc.) can be monitored and received on paging occasion during SDT procedure on the associated BWP.

Figure 8:
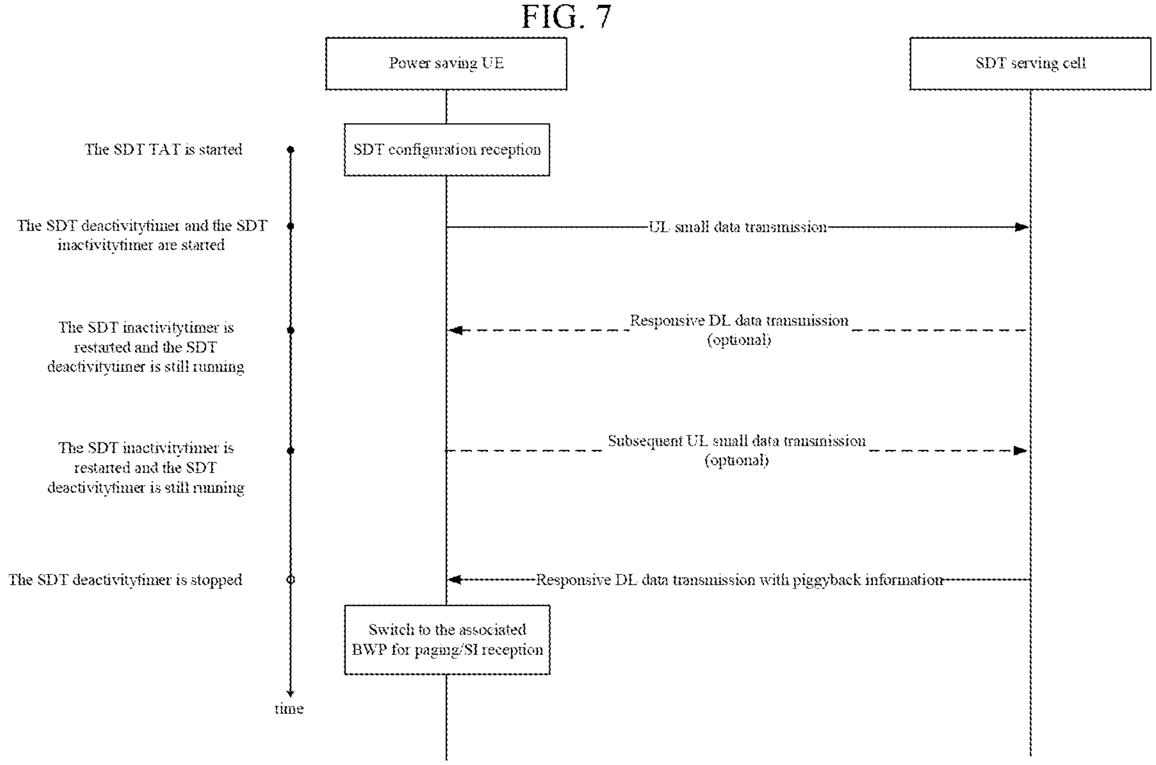
FIG. 8 is a flowchart of a SDT method according to a second embodiment of the present disclosure.

FIG. 8 illustrates a second embodiment of the present disclosure as described below.

Based on the SDT architecture of a BWP communication system as depicted in FIG. 4, FIG. 8 shows a power saving UE performs explicitly signaling-based system information update/change during SDT between BWPs. In general, the operations of SDT TAT, SDT deactivitytimer, and SDT inactivitytimer have been described in detail in the aforesaid embodiments, and thus will not be repeated herein. Only the differences between the power saving UE and the SDT serving cell will be described below.

When the UL small data is transmitted on the associated SDT BWP, a responsive DL data may be received. If the network is aware of the upcoming system information update/change, a SI change indication/PWS indication would be piggybacked on the responsive DL data. Upon the reception of SI change indication/PWS indication, the SDT deactivitytimer is stopped and the power saving UE would switch to the associated BWP for paging/updated system information reception. In some cases (e.g., the stopped of SDT deactivitytimer but the running of SDT inactivitytimer), upon the reception of SI change indication/PWS indication, the power saving UE can determine whether to switch the BWP based on UE's implementation. If the ongoing SDT procedure is higher priority, the power saving UE may complete the SDT session until the expiry of SDT inactivitytimer. If the power saving UE decide to switch from active SDT BWP to initial or default SDT BWP at the stopped SDT deactivitytimer no matter the running of SDT inactivitytimer, after the reception of paging/updated system information/emergency information, it would switch back to the active SDT BWP for proceeding SDT (not shown). In some other cases (e.g., there is no initial small data transmission/reception during the running of SDT TAT), upon the reception of SI change indication/PWS indication, even if the SDT deactivitytimer and SDT inactivitytimer are not started, the power saving UE would switch to the associated BWP for paging/updated system information reception (not shown).

From the power saving UE's point of view, when the SDT TAT, SDT deactivitytimer or SDT inactivitytimer are not running on the associated SDT BWP, the power saving UE would switch to the initial or default SDT BWP for paging/updated system information reception based on the network and UE configuration. As a result, the paging/updated system information can be received during SDT procedure on the associated BWP.

Figure 9:
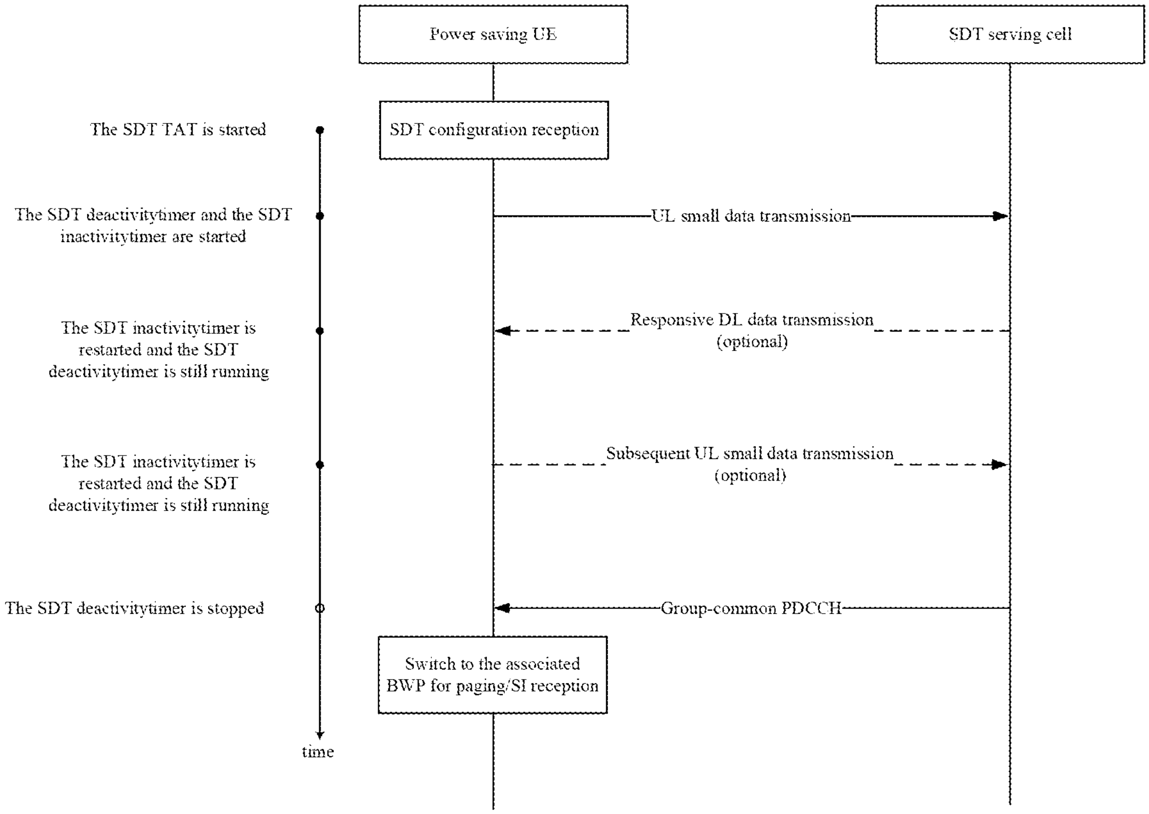
FIG. 9 is a flowchart of a SDT method according to a third embodiment of the present disclosure.

FIG. 9 illustrates a third embodiment of the present disclosure as described below.

Based on the SDT architecture of a BWP communication system as depicted in FIG. 4, FIG. 9 shows a power saving UE performs explicitly signaling-based system information update/change during SDT between BWPs. In general, the operations of SDT TAT, SDT deactivitytimer, and SDT inactivitytimer have been described in detail in the aforesaid embodiments, and thus will not be repeated herein. Only the differences between the power saving UE and the SDT serving cell will be described below.

When the UL small data is transmitted on the associated SDT BWP, a responsive DL data may be received. If the network is aware of the upcoming system information update/change, a new DCI format would be transmitted on the group-common PDCCH. The new DCI format may indicate the SI change indication/PWS indication, switching timeOffset, switching BWPID, and/or SI change related information. Upon the reception of group-common PDCCH, the SDT deactivitytimer is stopped and the power saving UE would switch to the associated BWP for paging/updated system information reception based on the indication of DCI. In some cases (e.g., the stopped of SDT deactivitytimer but the running of SDT inactivitytimer), upon the reception of group-common PDCCH, the power saving UE can determine whether to switch the BWP based on UE's implementation. If the ongoing SDT procedure is higher priority, the power saving UE may complete the SDT session until the expiry of SDT inactivitytimer. If the power saving UE decide to switch from active SDT BWP to initial or default SDT BWP at the stopped SDT deactivitytimer no matter the running of SDT inactivitytimer, after the reception of paging/updated system information/emergency information, it would switch back to the active SDT BWP for proceeding SDT (not shown). In some other cases (e.g., there is no initial small data transmission/reception during the running of SDT TAT), upon the reception of group-common PDCCH, even if the SDT deactivitytimer and SDT inactivitytimer are not started, the power saving UE would switch to the associated BWP for paging/updated system information reception (not shown).

From the power saving UE's point of view, when the SDT TAT, SDT deactivitytimer or SDT inactivitytimer are not running on the associated SDT BWP, the power saving UE would switch to the initial or default SDT BWP for paging/updated system information reception based on the indication of DCI and UE configuration. As a result, the paging/updated system information can be received during SDT procedure on the associated BWP.

Figure 10:
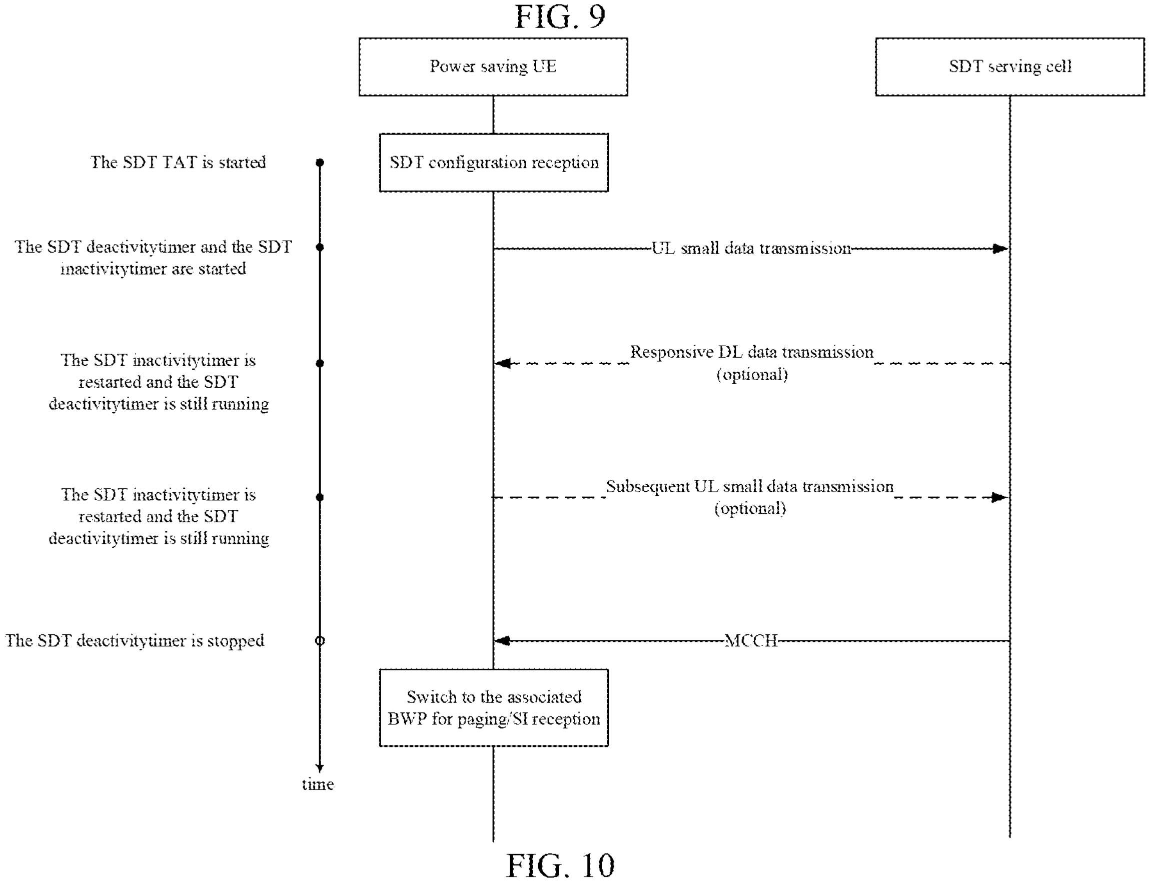
FIG. 10 is a flowchart of a SDT method according to a fourth embodiment of the present disclosure.

FIG. 10 illustrates a fourth embodiment of the present disclosure as described below.

Based on the SDT architecture of a BWP communication system as depicted in FIG. 4, FIG. 10 shows a power saving UE performs explicitly signaling-based system information update/change during SDT between BWPs. In general, the operations of SDT TAT, SDT deactivitytimer, and SDT inactivitytimer have been described in detail in the aforesaid embodiments, and thus will not be repeated herein. Only the differences between the power saving UE and the SDT serving cell will be described below.

If the power saving UE is also an MBS-capable UE, the power saving UE can transmit UL small data and may receive multicast/broadcast service data during SDT operation. When the UL small data is transmitted on the associated SDT BWP, a responsive DL data may be received. If the network is aware of the upcoming system information update/change, at least a SI change indication/PWS indication would be transmitted on MCCH. Upon the reception of SI change indication/PWS indication, the SDT deactivitytimer is stopped and the power saving UE would switch to the associated BWP for paging/updated system information reception based on the switching indication on MCCH. In some cases (e.g., the stopped of SDT deactivitytimer but the running of SDT inactivitytimer), upon the reception of switching indication on MCCH, the power saving UE can determine whether to switch the BWP based on UE's implementation. If the ongoing SDT procedure is higher priority, the power saving UE may complete the SDT session until the expiry of SDT inactivitytimer. If the power saving UE decide to switch from active SDT BWP to initial or default SDT BWP at the stopped SDT deactivitytimer no matter the running of SDT inactivitytimer, after the reception of paging/updated system information/emergency information, it would switch back to the active SDT BWP for proceeding SDT (not shown). In some other cases (e.g., there is no initial small data transmission/reception during the running of SDT TAT), upon the reception of switching indication on MCCH, even if the SDT deactivitytimer and SDT inactivitytimer are not started, the power saving UE would switch to the associated BWP for paging/updated system information reception (not shown).

From the power saving UE's point of view, when the SDT TAT, SDT deactivitytimer or SDT inactivitytimer are not running on the associated SDT BWP, the power saving UE would switch to the initial or default SDT BWP for paging/updated system information reception based on switching indication within MCCH and UE configuration. As a result, the paging/updated system information can be received during SDT procedure on the associated BWP.

Figure 11:
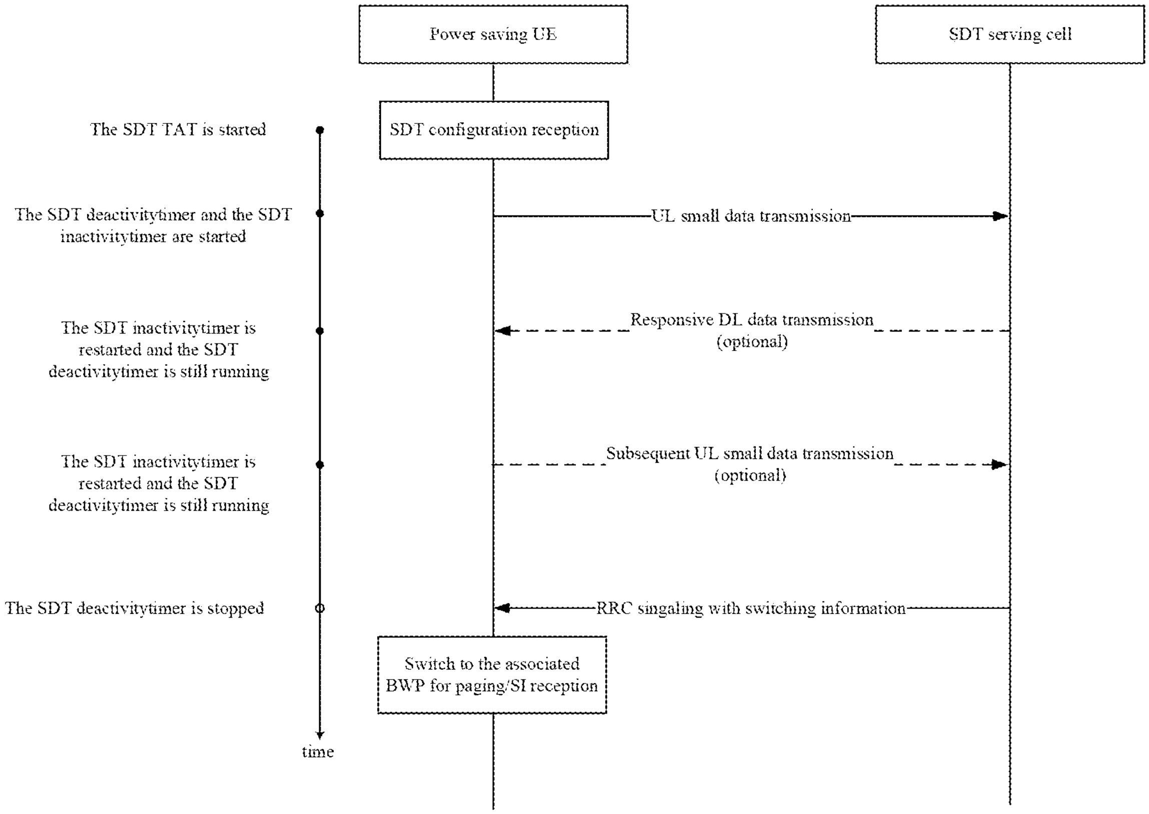
FIG. 11 is a flowchart of a SDT method according to a fifth embodiment of the present disclosure.

FIG. 11 illustrates a fifth embodiment of the present disclosure as described below.

Based on the SDT architecture of a BWP communication system as depicted in FIG. 4, FIG. 11 shows a power saving UE performs explicitly signaling-based system information update/change during SDT between BWPs. In general, the operations of SDT TAT, SDT deactivitytimer, and SDT inactivitytimer have been described in detail in the aforesaid embodiments, and thus will not be repeated herein. Only the differences between the power saving UE and the SDT serving cell will be described below.

When the UL small data is transmitted on the associated SDT BWP, a responsive DL data may be received. If the network is aware of the upcoming system information update/change, a RRC signaling (e.g., RRCRelease) with BWP switching information element (IE) would be transmitted to the power saving UE. The new BWP switching IE may indicate the SI change indication/PWS indication, switching timeOffset, switching BWPID, and/or SI change related information. Upon the reception of RRC signaling, the SDT deactivitytimer is stopped and the power saving UE would switch to the associated BWP for paging/updated system information reception based on the received BWP switching IE. It should be noted that the network can also indicate the power saving UE to release CG-SDT resource on the associated BWP via the indication of BWP switching IE. For example, the BWP switching IE may set the switching BWPID to initial BWP when the network is congested. Upon the reception of BWP switching IE, the power saving UE may release the CG-SDT resources on the associated BWP and switch to the initial BWP for RA-SDT or initial access.

In some cases (e.g., the stopped SDT deactivitytimer but the running of SDT inactivitytimer), upon the reception of RRC signaling with BWP switching IE, the power saving UE can determine whether to switch the BWP based on UE's implementation. If the ongoing SDT procedure is higher priority, the power saving UE may complete the SDT session until the expiry of SDT inactivitytimer. If the power saving UE decide to switch from active SDT BWP to initial or default SDT BWP at the stopped SDT deactivitytimer no matter the running of SDT inactivitytimer, after the reception of paging/updated system information/emergency information, it would switch back to the active SDT BWP for proceeding SDT (not shown). In some other cases (e.g., there is no initial small data transmission/reception during the running of SDT TAT), upon the reception of RRC signaling with BWP switching IE, even if the SDT deactivitytimer and SDT inactivitytimer are not started, the power saving UE would switch to the associated BWP for paging/updated system information reception (not shown).

From the power saving UE's point of view, when the SDT TAT, SDT deactivitytimer or SDT inactivitytimer are not running on the associated SDT BWP, the power saving UE would switch to the initial or default SDT BWP for paging/updated system information reception based on BWP switching IE and UE configuration. As a result, the paging/updated system information can be received during SDT procedure on the associated BWP.

Figure 12:
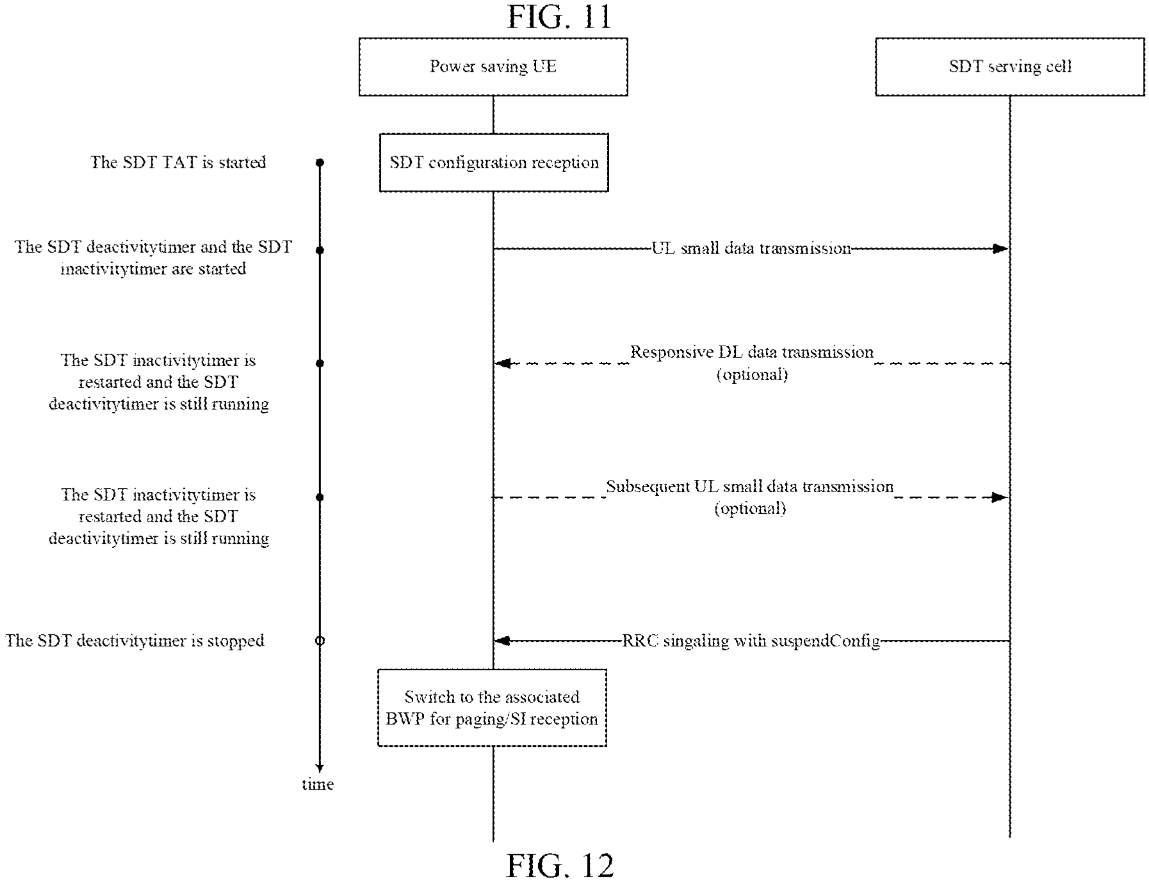
FIG. 12 is a flowchart of a SDT method according to a sixth embodiment of the present disclosure.

FIG. 12 illustrates a sixth embodiment of the present disclosure as described below.

Based on the SDT architecture of a BWP communication system as depicted in FIG. 4, FIG. 12 shows a power saving UE performs explicitly signaling-based system information update/change during SDT between BWPs. In general, the operations of SDT TAT, SDT deactivitytimer, and SDT inactivitytimer have been described in detail in the aforesaid embodiments, and thus will not be repeated herein. Only the differences between the power saving UE and the SDT serving cell will be described below.

When the UL small data is transmitted on the associated SDT BWP, a responsive DL data may be received. If the network is aware of the upcoming system information update/change, a RRC signaling (e.g., RRCRelease) with suspendConfig IE would be transmitted to the power saving UE. The suspendConfig IE may indicate the SI change indication/PWS indication, switching timeOffset, switching BWPID, new SDT configuration, and/or SI change related information. Upon the reception of RRC signaling, the SDT deactivitytimer is stopped and the power saving UE would switch to the associated BWP for paging/updated system information reception based on the received suspendConfig IE. It should be noted that the network can also indicate the power saving UE to apply the new SDT configuration after the reception of updated system information. For example, if the suspendConfig IE includes the new SDT configuration, the power saving UE would apply the new SDT configuration and switch to the indicated BWP for SDT after the reception of updated system information.

In some cases (e.g., the stopped SDT deactivitytimer but the running of SDT inactivitytimer), upon the reception of RRC signaling with suspendConfig IE, the power saving UE can determine whether to switch the BWP based on UE's implementation. If the ongoing SDT procedure is higher priority, the power saving UE may complete the SDT session until the expiry of SDT inactivitytimer. If the power saving UE decide to switch from active SDT BWP to initial or default SDT BWP at the stopped SDT deactivitytimer no matter the running of SDT inactivitytimer, after the reception of paging/updated system information/emergency information, it would switch back to the active SDT BWP for proceeding SDT or switch to the associated BWP as indicated in new SDT configuration, if configured (not shown). In some other cases (e.g., there is no initial small data transmission/reception during the running of SDT TAT), upon the reception of RRC signaling with suspendConfig IE, even if the SDT deactivitytimer and SDT inactivitytimer are not started, the power saving UE would switch to the associated BWP for paging/updated system information reception (not shown).

From the power saving UE's point of view, when the SDT TAT, SDT deactivitytimer or SDT inactivitytimer are not running on the associated SDT BWP, the power saving UE would switch to the initial or default SDT BWP for paging/updated system information reception based on suspendConfig IE and UE configuration. As a result, the paging/updated system information can be received during SDT procedure on the associated BWP.

Figure 13:
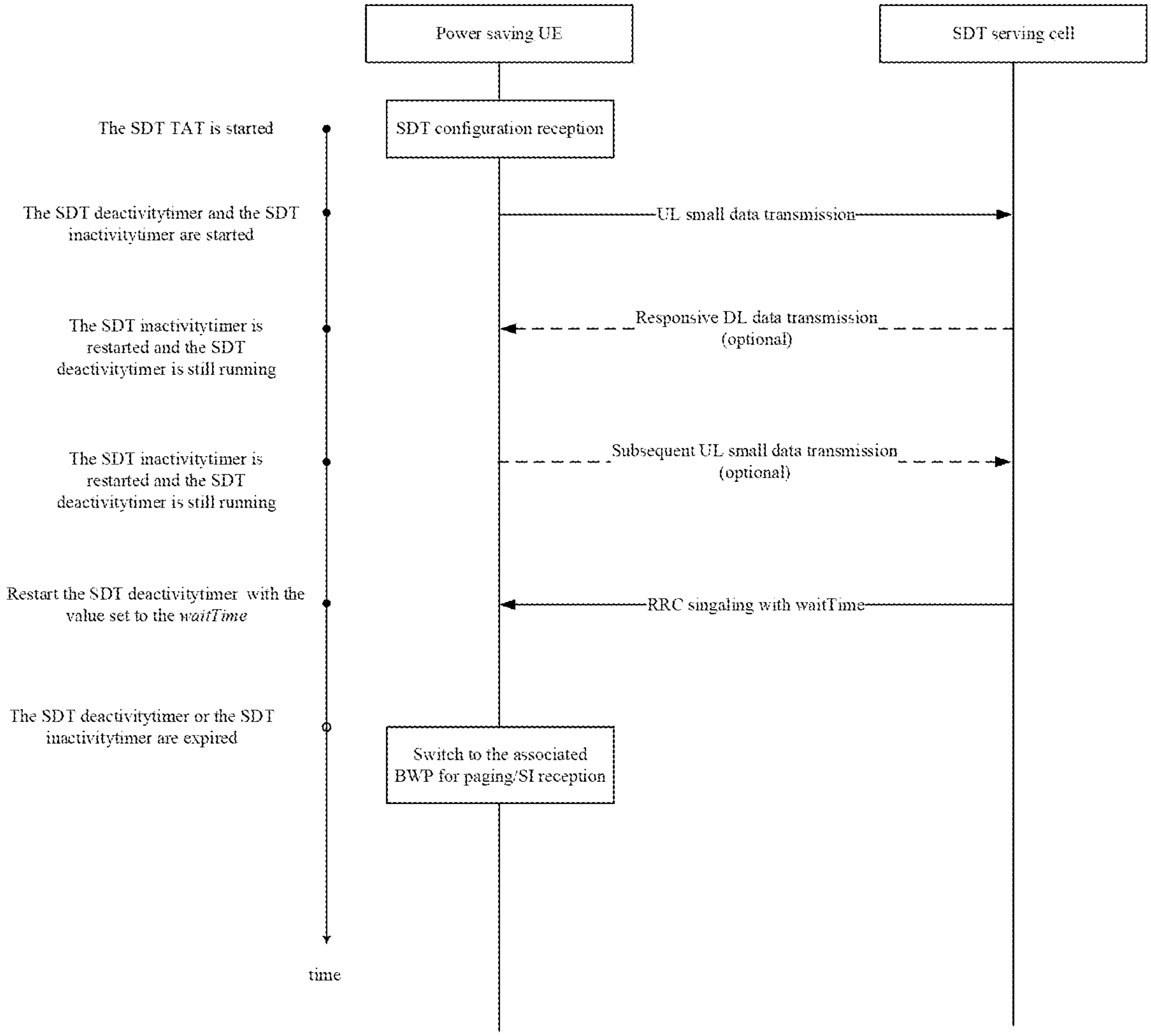
FIG. 13 is a flowchart of a SDT method according to a seventh embodiment of the present disclosure.

FIG. 13 illustrates a seventh embodiment of the present disclosure as described below.

Based on the SDT architecture of a BWP communication system as depicted in FIG. 4, FIG. 13 shows a power saving UE performs explicitly signaling-based system information update/change during SDT between BWPs. In general, the operations of SDT TAT, SDT deactivitytimer, and SDT inactivitytimer have been described in detail in the aforesaid embodiments, and thus will not be repeated herein. Only the differences between the power saving UE and the SDT serving cell will be described below.

When the UL small data is transmitted on the associated SDT BWP, a responsive DL data may be received. If the network is aware of the upcoming system information update/change, a RRC signaling (e.g., RRCRelease, RRCReject) with waitTime would be transmitted to the power saving UE. The waitTime may indicate the power saving UE to switch from active SDT BWP to initial or default SDT BWP after the waitTime duration. Upon the reception of RRC signaling with waitTime, the SDT deactivitytimer is restarted with the value set to the waitTime. The power saving UE would switch to the associated BWP for paging/updated system information reception upon the expiry of SDT deactivitytimer (i.e., after the waitTime duration).

In some cases (e.g., the expiry of SDT deactivitytimer but the running of SDT inactivitytimer), upon the reception of RRC signaling with waitTime, the power saving UE can determine whether to switch the BWP based on UE's implementation. If the ongoing SDT procedure is higher priority, the power saving UE may complete the SDT session until the expiry of SDT inactivitytimer. If the power saving UE decide to switch from active SDT BWP to initial or default SDT BWP at the expiry of SDT deactivitytimer no matter the running of SDT inactivitytimer, after the reception of paging/updated system information/emergency information, it would switch back to the active SDT BWP for proceeding SDT (not shown). It should be noted that the network can also include the aforesaid BWP switching IE or suspendConfig IE in the RRC signaling in addition to waitTimer. The behavior of the received BWP switching IE or suspendConfig IE have been described in detail in the aforesaid embodiments, and thus will not be repeated. If the power saving UE receives the RRC signaling with waitTime including BWP switching IE or suspendConfig IE, the SDT deactivitytimer is restarted with the value set to the waitTime. The power saving UE would switch to the associated BWP for paging/updated system information reception based on the expiry of SDT deactivitytimer (i.e., after the waitTime duration) and the indication of BWP switching IE or suspendConfig IE.

From the power saving UE's point of view, when the SDT TAT, SDT deactivitytimer or SDT inactivitytimer are not running on the associated SDT BWP, the power saving UE would switch to the initial or default SDT BWP for paging/updated system information reception based on the network and UE configuration. As a result, the paging/updated system information can be received during SDT procedure on the associated BWP.

An eighth embodiment of the present disclosure is described as follows.

In some aforesaid embodiments, the operations of SDT TAT, SDT deactivitytimer, and SDT inactivitytimer have been described in detail in the aforesaid embodiments, and thus will not be repeated herein. The power saving UE can thus transmit on-demand system information request on the associated BWP whenever it needs. The updated/changed system information may be transmitted to the power saving UE via unicast/broadcast in response to the request (not shown).

A ninth embodiment of the present disclosure is described as follows.

In some aforesaid embodiments, the operations of SDT TAT, SDT deactivitytimer, and SDT inactivitytimer have been described in detail in the aforesaid embodiments, and thus will not be repeated herein. With RAN functional split as show in FIG. 3, the associated gNB-CU/gNB-DU F1AP signaling may be used. The RRC message proposed in this embodiment is encapsulated in the F1AP signaling(s) (e.g., DL/UL RRC Message Transfer, etc.) and will not be described again.

Commercial interests for some embodiments are as follows. 1. solving issues in the prior art. 2. monitoring system information change and/or public warning system information on associated BWP during SDT. 3. both CG-SDT and RA-SDT are supported. 4. both paired and unpaired spectrum are supported. 5. lower power consumption for small data transmission. 6. higher bandwidth capacity for small data transmission. 7. lower data congestion on the initial BWP. 8. better resource efficiency for 5G networks. 9. lower signaling overhead for system information change. 10. improving resource efficiency. 11. providing a good communication performance. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

The embodiment of the present application further provides a computer readable storage medium for storing a computer program. The computer readable storage medium enables a computer to execute corresponding processes implemented by the UE/BS in each of the methods of the embodiment of the present disclosure. For brevity, details will not be described herein again.

The embodiment of the present application further provides a computer program product including computer program instructions. The computer program product enables a computer to execute corresponding processes implemented by the UE/BS in each of the methods of the embodiment of the present disclosure. For brevity, details will not be described herein again.

The embodiment of the present application further provides a computer program. The computer program enables a computer to execute corresponding processes implemented by the UE/BS in each of the methods of the embodiment of the present disclosure. For brevity, details will not be described herein again.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor including the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may include at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

While the present application has been described in connection with what is considered the most practical and preferred embodiments, it is understood that the present application is not limited to the disclosed embodiments but is intended to cover various arrangements made without departing from the scope of the broadest interpretation of the appended claims.

The invention claimed is:

1. A method for small data transmission (SDT) in a power saving state, performed by a user equipment (UE) in a network, the method comprising:

applying at least one SDT related timer during the SDT on a first SDT bandwidth part (BWP) for the UE in the power saving state;

if the at least one SDT related timer is not running on the first SDT BWP, switching from the first SDT BWP to a second SDT BWP for receiving at least one of updated system information (SI) or public warning system (PWS) information from the network;

receiving at least one of a SI change indication or a PWS indication from the network before switching to the second SDT BWP; and upon reception of the at least one of the SI change indication or the PWS indication, no matter whether the at least one SDT related timer is running, switching from the first SDT BWP to the second SDT BWP for receiving the updated SI indicated by the SI change indication or receiving the PWS information indicated by the PWS indication.

2. The method of claim 1, wherein the second SDT BWP is an initial BWP and the first SDT BWP is an active SDT BWP; or, the second SDT BWP is the initial BWP and the first SDT BWP is a default SDT BWP; or, the second SDT BWP is the default SDT BWP and the first SDT BWP is the active SDT BWP, and wherein the initial BWP is initially set for the SDT in the power saving state, the active SDT BWP is a SDT BWP currently activated for the SDT, and the default SDT BWP if configured is a SDT BWP to which the active SDT BWP automatically switches when the active SDT BWP is deactivated.

3. The method of claim 1, wherein at least two of the initial BWP, the default SDT BWP or the active SDT BWP are operated on paired spectrum for frequency division duplex (FDD) system or are operated on paired spectrum for time division duplex (TDD) system.

4. The method of claim 1, wherein the at least one SDT related timer comprises at least one of a SDT timing alignment timer (TAT) for keeping uplink (UL) time alignment with the network during the SDT in the power saving state, a SDT deactivity timer that is associated with SDT paging cycle or paging occasion, or a SDT inactivity timer is associated with SDT characteristic in the power saving state.

5. The method of claim 4, wherein if the at least one of the SDT TAT, the SDT deactivity timer or the SDT inactivity timer is not running on the first SDT BWP, the switching step comprises:

switching from the first SDT BWP to the second SDT BWP for monitoring the at least one of the SI change indication or the PWS indication on a paging occasion, and receiving the updated SI indicated by the SI change indication or receiving the PWS information indicated by the PWS indication.

6. The method of claim 4, further comprising:

upon an expiry of the SDT TAT in the power saving state, releasing configured grant (CG)-SDT resources on the first SDT BWP and switching to the second SDT BWP for receiving the at least one of the updated SI or the PWS information.

7. The method of claim 4, further comprising:

upon an expiry of the SDT TAT in the power saving state while SDT inactivitytimer is running, releasing CG-SDT resources on the first SDT BWP, and falling back to random access (RA)-SDT on the first SDT BWP.

8. The method of claim 7, wherein for the RA-SDT on the first SDT BWP, the UE receives one of multiple preamble groups corresponding to different payload sizes for small data that can be configured by the network.

9. The method of claim 7, wherein the RA-SDT is performed on an active BWP when the CG-SDT resources are released.

10. The method of claim 4, further comprising:

if the SDT deactivity timer is not running but the SDT inactivity timer is still running, upon reception of the updated SI or the PWS information, switching from the second SDT BWP back to the first SDT BWP for proceeding the SDT.

11. The method of claim 4, further comprising:

upon reception of the at least one of the SI change indication or the PWS indication, stopping the SDT deactivity timer to switch to the second SDT BWP for receiving the at least one of the updated SI or the PWS information based on the received indication.

12. The method of claim 4, further comprising:

upon reception of the at least one of the SI change indication or the PWS indication, completing an ongoing SDT with a priority higher than a threshold until an expiry of the SDT inactivity timer.

13. The method of claim 4, further comprising:

upon reception of the at least one of the SI change indication or the PWS indication, stopping the SDT deactivity timer and switching to the second SDT BWP for receiving the at least one of the updated SI or the PWS information based on the received indication no matter whether the SDT inactivity timer is running; and after reception of the at least one of the updated SI or the PWS information, switching from the second SDT BWP back to the first SDT BWP for proceeding the SDT.

14. The method of claim 1, further comprising:

if the at least one SDT related timer is not running on the first SDT BWP, after switching to the second SDT BWP, receiving the at least one of the SI change indication or the PWS indication on the second SDT BWP before reception of the at least one of updated SI or PWS information.

15. The method of claim 1, further comprising:

receiving a RRC signaling with wait time;

after a duration of the wait time, switching from the first SDT BWP to the second SDT BWP for receiving the at least one of the updated SI or the PWS information.

16. A user equipment (UE), comprising a memory, a transceiver and a processor coupled to the memory and the transceiver, the processor configured to call and run program instructions stored in a memory, to cooperate with the transceiver to execute the method of claim 1.

17. The method of claim 1, wherein the transmitted SDT is configured grant (CG)-SDT, and the UE is configured by the network with at least one of multiple configurations corresponding to different payload sizes of small data for the CG-SDT.

18. The method of claim 1, wherein the second SDT BWP is the default SDT BWP and the first SDT BWP is the active SDT BWP, and the active SDT BWP is a separate BWP other than the default SDT BWP.

19. A method for small data transmission (SDT) in a power saving state, performed by a base station (BS) in a network, the method comprising:

configuring a user equipment (UE) with at least one SDT related timer for the UE to apply during the SDT on a first SDT bandwidth part (BWP) in the power saving state; and if the at least one SDT related timer is not running on the first SDT BWP, expecting the UE to switch from the first SDT BWP to a second SDT BWP for receiving at least one of updated system information (SI) or public warning system (PWS) information from the BS;

transmitting at least one of a SI change indication or a PWS indication to the UE before the UE switches to the second SDT BWP; and upon transmission of the at least one of the SI change indication or the PWS indication, expecting the UE to switch, no matter whether the at least one SDT related timer is running, from the first SDT BWP to the second SDT BWP for receiving the updated SI indicated by the SI change indication or receiving the PWS information indicated by the PWS indication.

20. A base station (BS), comprising a memory, a transceiver and a processor coupled to the memory and the transceiver, the processor configured to call and run program instructions stored in a memory, to cooperate with the transceiver to execute the method of claim 19.

* * * * *